(12) United States Patent
Crawford et al.

(10) Patent No.: US 9,654,598 B1
(45) Date of Patent: May 16, 2017

(54) USER CUSTOMIZATION OF CARDS

(71) Applicant: Le Technology, Inc., San Jose, CA (US)

(72) Inventors: Eric Crawford, Santa Clara, CA (US); Esakkiappan Sankaran, Sunnyvale, CA (US); Kent Oberheu, Berkeley, CA (US)

(73) Assignee: Le Technology, Inc., San Jose, CA (US)

( * ) Notice: Subject to any disclaimer, the term of this patent is extended or adjusted under 35 U.S.C. 154(b) by 0 days.

(21) Appl. No.: 15/264,388

(22) Filed: Sep. 13, 2016

Related U.S. Application Data

(60) Provisional application No. 62/371,982, filed on Aug. 8, 2016.

(51) Int. Cl.
| | | |
|---|---|---|
| *H04B 1/38* | (2015.01) | |
| *H04L 29/08* | (2006.01) | |
| *H04W 4/00* | (2009.01) | |
| *H04W 4/02* | (2009.01) | |
| *H04W 88/02* | (2009.01) | |

(52) U.S. Cl.
CPC ............ *H04L 67/34* (2013.01); *H04L 67/22* (2013.01); *H04L 67/306* (2013.01); *H04L 67/36* (2013.01); *H04W 4/003* (2013.01); *H04W 4/023* (2013.01); *H04W 88/02* (2013.01)

(58) Field of Classification Search
CPC ....... H04L 67/34; H04L 67/22; H04L 67/306; H04L 67/36; H04W 4/003; H04W 4/023; H04W 88/02

USPC .......... 455/558, 410, 411, 414.1; 379/433.09
See application file for complete search history.

(56) References Cited

U.S. PATENT DOCUMENTS

| | | | | |
|---|---|---|---|---|
| 7,124,938 | B1 * | 10/2006 | Marsh ...................... | G06F 21/10 235/380 |
| 9,274,683 | B2 * | 3/2016 | Fey ........................ | G06F 3/0484 |
| 2006/0190616 | A1 * | 8/2006 | Mayerhofer ............ | H04L 67/20 709/231 |
| 2011/0029988 | A1 * | 2/2011 | Mittal ....................... | G06F 9/54 719/314 |
| 2011/0153793 | A1 * | 6/2011 | Tan ..................... | H04L 63/0272 709/222 |
| 2013/0031486 | A1 * | 1/2013 | Schultz ............. | H04M 1/72519 715/748 |
| 2013/0344899 | A1 * | 12/2013 | Stamm ................... | G01C 21/00 455/456.3 |
| 2014/0052859 | A1 * | 2/2014 | Kruglick ................. | H04L 41/00 709/225 |

(Continued)

*Primary Examiner* — Dominic Rego
(74) *Attorney, Agent, or Firm* — Rutan & Tucker LLP

(57) ABSTRACT

Each card uses one or more APIs to actively pull content or have content pushed from apps resident in memories of the device and other content supplied from computing devices external to the device. Each card is particularized to a specific category of information to showcase content on a display screen of the device from the apps and the other content, which is all aggregated on a corresponding card for that category of information. A configuration screen is also presented to allow the user of the device to customize their own user experience on the device by selecting as potential content sources from the apps and the external computing devices to supply an extracted newest version of content to be displayed on the one or more cards to personalize content and provide better engagement with the user of the device.

22 Claims, 19 Drawing Sheets

(56) References Cited

U.S. PATENT DOCUMENTS

| | | | | |
|---|---|---|---|---|
| 2014/0351257 A1* | 11/2014 | Zuzik | .................... | H04L 67/10 |
| | | | | 707/740 |
| 2014/0365395 A1* | 12/2014 | Arguelles | ............... | G06Q 10/10 |
| | | | | 705/342 |
| 2015/0026015 A1* | 1/2015 | Fishman | ............ | G06Q 30/0627 |
| | | | | 705/26.63 |
| 2015/0249720 A1* | 9/2015 | Delug | .................... | H04L 67/36 |
| | | | | 709/219 |
| 2016/0231881 A1* | 8/2016 | Sirpal | ................... | H04L 51/046 |
| 2016/0352816 A1* | 12/2016 | Xiao | .................... | H04W 4/206 |

\* cited by examiner

| Item # | Card Category | Content Description |
|---|---|---|
| 1 | Date & Time / Weather | date & time / current weather conditions |
| 2 | App Category (Favorites, Music, ...) | collection of app shortcuts |
| 3 | Live | recently played stream + 2 featured channels |
| 4 | Sports | 3-most recent sports videos |
| 5 | Themes & Wallpapers | 3-5 latest themes or wallpapers |
| 6 | Apps & Tips | 3-5 most recent tips/app recommendations |
| 7 | Video | 3-5 popular videos |
| 8 | Calendar | Items in today's calendar |
| 9 | Gaming | partner game promotions |

| Item # | Card Category | Content Description |
| --- | --- | --- |
| 10 | Device Status | Battery % | RAM Usage | Storage Used/Available |
| 11 | Mail | view of most recent messages |
| 12 | Places Nearby | links to Google Maps search for restaurants, shopping, & transit |
| 13 | Notes | recent notes |
| 14 | Music Player | music player w/ most recent track |
| 15 | News | latest news articles (3rd party) |
| Ph2 | Social | Latest post from social channels |
| Ph2 | Community | Latest post from the community |

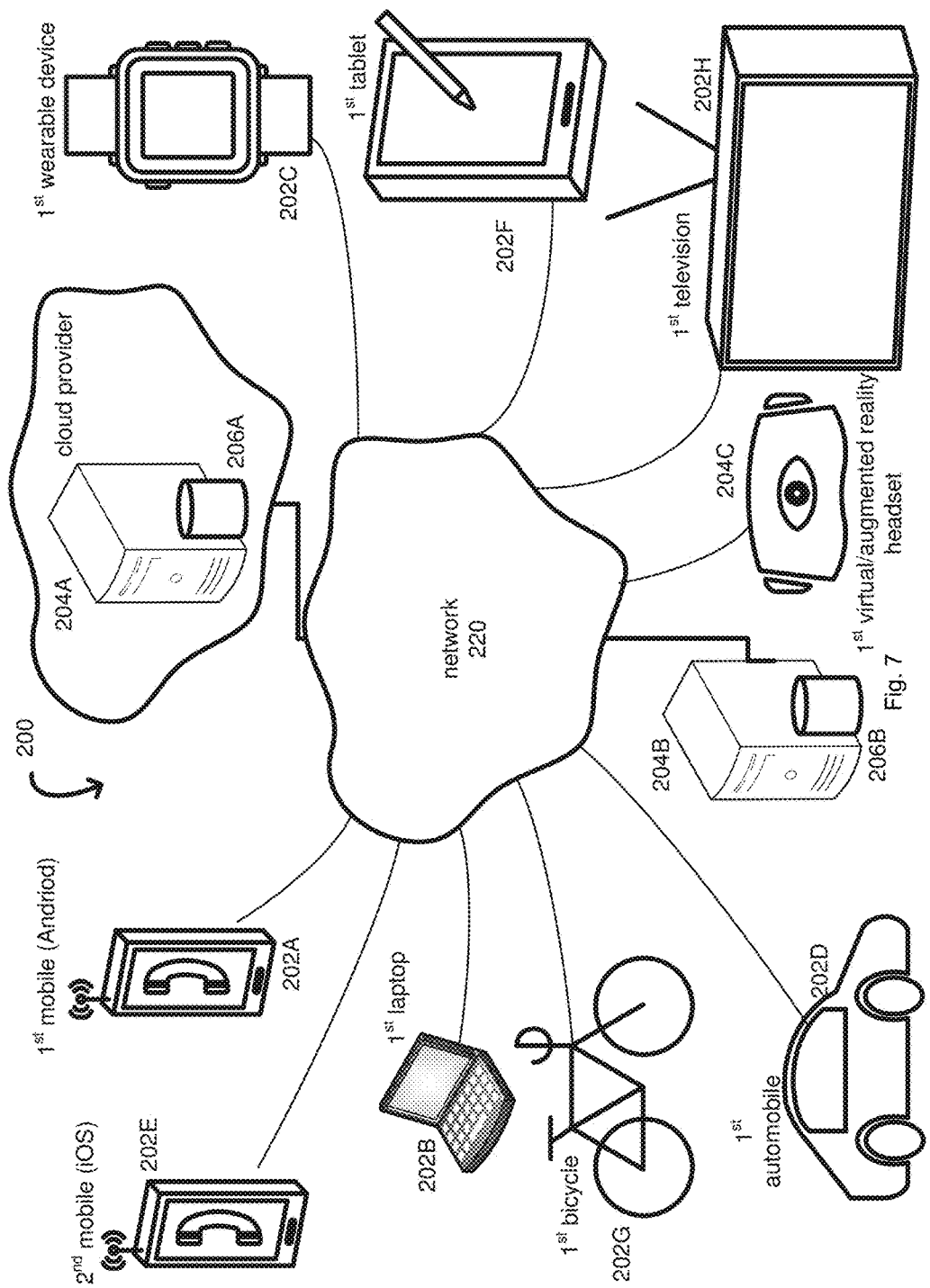

( Cont. )

The user interface presents at least eight different cards from the above group, and a data collection routine in the computing device collects user behavior on the computing device and sends this information to the analytics module, where the analytics module receives data on the user's behavior from at least one other device platform to form the user profile on the user, and where one or more of the cards that utilize the user profile are shared across these different device platforms to be displayed on these different device platforms.
912

The application programming interfaces are configured to extract content from the apps and the other content sources via use of one or more content retrieval mechanisms selected from the group consisting of a restful web application programming interface, a Rich Site Summary (RSS) feed, an Atom feed, a HyperText Markup Language (HTML) WebView, a widget coded to remotely view content, and any combination of these, where having a set of different content retrieval mechanisms allows a first module to any of i) actively pull content from the content sources to a corresponding card screen, ii) establish an automatic forwarding that pushes content from the content sources to a corresponding card screen, or iii) both push to and pull information to the corresponding card screen as well as provide a flexibility to access different kinds of data aggregated and shown on a same category of card screen
914

Expand or collapse a card screen into a collapsed window size state to show a subset of information or into an expanded window size state to show a fuller set of information on that card screen from a single data structure containing an entire set of information by resizing a size of a window displaying the content within the card screen, where use of a single data structure as a source for the set of information causes a smoother animation transition on the display screen to show the displayed content from the single data structure rather than drawing content from two or more data structures, each containing their own set of information being displayed in the window
916

Pop-up windows and or other notes on the set of cards themselves suggest personalized content services based on a user profile to assist the user of the computing device in selecting content sources to be selected and displayed on the one or more cards, where the analytics module may gather additional data from a web bot or network information gathering device to actively gain information from content sources on the Internet or from cooperating partners to deliver additional content including products services and information to the user of the computing device based on the user profile, which are then suggested on the appropriate card screen representing that category of content.

918

The suggested personalized content services for the corresponding cards can include any of the following selected from a group consisting of suggested targeted content based on a stage in ownership lifecycle of the computing device including targeted content for a new owner and that same targeted content refined out for an established owner;

suggested apps to download and use as content sources for a card category that are not already resident on the computing device based on a current app usage and other information in the user profile;

suggested video content for the card category based on passion points, preferred genres, and profile card of video in the user profile;

suggested places geographically nearby to a location of the computing device for the card category based on i) interests in the user's profile, or ii) content from a server of a third party partner configured to cooperate with the user interface, and the location of the computing device;

suggested themes and wallpapers to use for the computing device based on interests in the user profile as well as past themes and wallpapers previously used;

suggested surveys and polls that the user of the computing device may participate in based on a lifecycle stage of ownership of the computing device and the user profile; and suggested promotions and offers that the user of the computing device is interested in based on the lifecycle stage and the user profile.

Analyzing and discovering a type of app resident in the memories of the computing device and what type of content is associated with the discovered app in order to aggregate and display content from that app into a corresponding category of card screen.
1010

↓

Presenting a roster screen listing of all possible cards in which the user may then individually select to enable or disable that card screen for display on the display screen.
1012

↓

Referencing a database containing a user profile that includes tracked user behavior to become contextually aware of the user's behavior, and Automatically assisting in enhancing the user's experience by supplying suggestions on all three of i) the content sources of the apps and the other content, ii) the presentation order of the different categories of cards, iii) the enablement or disablement of particular cards displayed by the user interface, all based on the analytic module being contextually aware of the user behavior via the user profile maintained on the user in the database.
1014

↓

Collecting user behavior on the computing device and send this information to an analytics module, where the analytics module receives data on the user's behavior from the computing device as well as from other device platforms, selected from a group consisting of a smart phone, a laptop, a computing tablet, a vehicle entertainment system, an interactive television, and a wearable electronic device, where one or more of the cards that utilize the user profile are shared across these different device platforms to be displayed on these different device platforms, where the analytics module assists to append individual app usage analytics to the user profile, which includes globally obtained user behavior from information collection algorithms on each of these device platforms, where the analytics module is configured to use the user profile based on the globally obtained user behavior across the these different device platforms to personalize content for the one or more cards to the user
1016

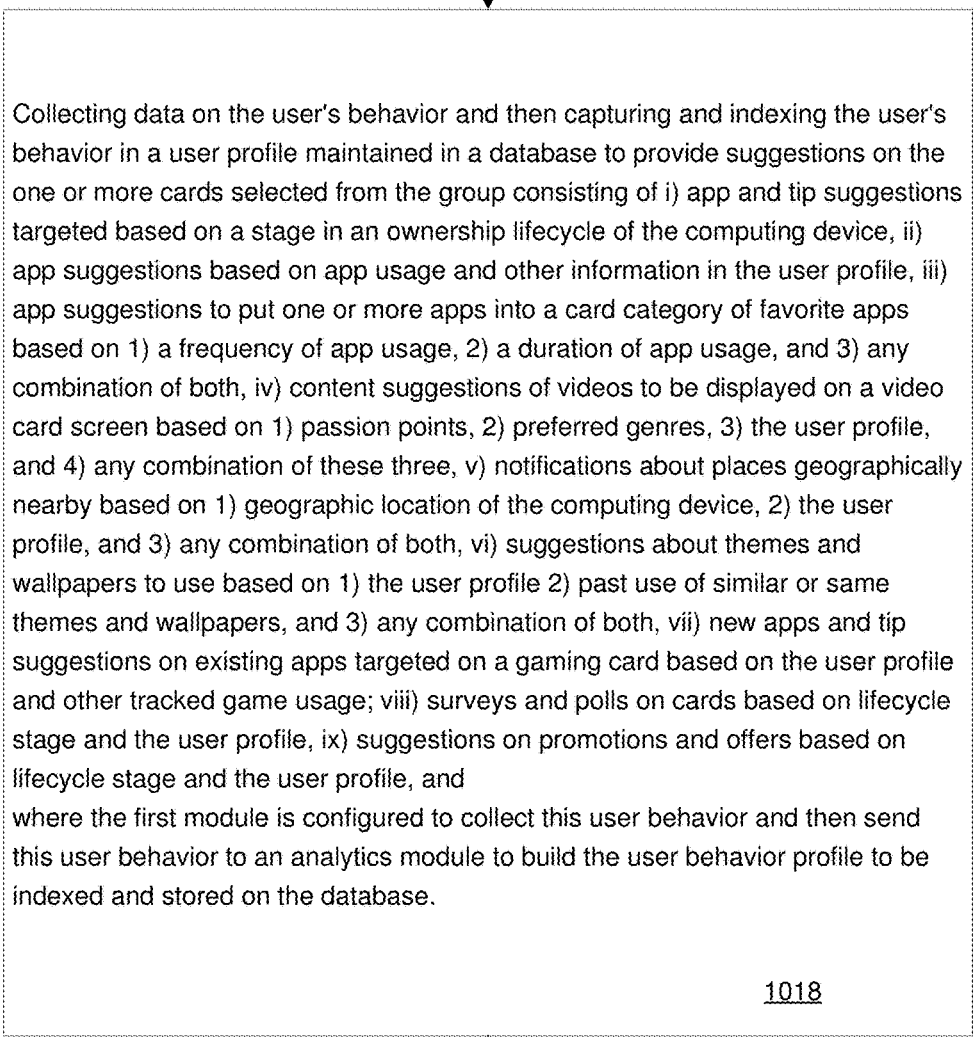

Collecting data on the user's behavior and then capturing and indexing the user's behavior in a user profile maintained in a database to provide suggestions on the one or more cards selected from the group consisting of i) app and tip suggestions targeted based on a stage in an ownership lifecycle of the computing device, ii) app suggestions based on app usage and other information in the user profile, iii) app suggestions to put one or more apps into a card category of favorite apps based on 1) a frequency of app usage, 2) a duration of app usage, and 3) any combination of both, iv) content suggestions of videos to be displayed on a video card screen based on 1) passion points, 2) preferred genres, 3) the user profile, and 4) any combination of these three, v) notifications about places geographically nearby based on 1) geographic location of the computing device, 2) the user profile, and 3) any combination of both, vi) suggestions about themes and wallpapers to use based on 1) the user profile 2) past use of similar or same themes and wallpapers, and 3) any combination of both, vii) new apps and tip suggestions on existing apps targeted on a gaming card based on the user profile and other tracked game usage; viii) surveys and polls on cards based on lifecycle stage and the user profile, ix) suggestions on promotions and offers based on lifecycle stage and the user profile, and
where the first module is configured to collect this user behavior and then send this user behavior to an analytics module to build the user behavior profile to be indexed and stored on the database.

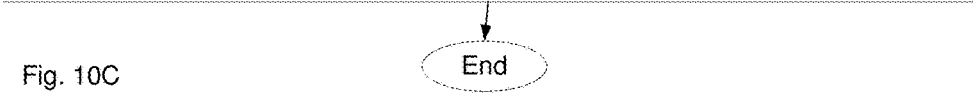

USER CUSTOMIZATION OF CARDS

NOTICE OF COPYRIGHT

A portion of the disclosure of this patent application contains material that is subject to copyright protection. The copyright owner has no objection to the facsimile reproduction by anyone of the software engine and its modules, as it appears in the United States Patent & Trademark Office's patent file or records, but otherwise reserves all copyright rights whatsoever.

RELATED APPLICATIONS

This application claims priority under 35 USC §119 to and the benefit of U.S. Provisional Patent Application Ser. No. 62/371,982, titled, "Card Screens," filed on Aug. 8, 2016.

FIELD

Embodiments of the design provided herein generally relate to user customization of cards and how this system assists with the customization of the cards.

BACKGROUND

Users of mobile devices have access to multiple apps and content from external services including similar apps and services on similar content.

SUMMARY

Provided herein in some embodiments are an apparatus, system, and methods describing aspects of the card concepts discussed herein. For example, a card module is configured to cooperate with components on the mobile computing device that include one or more processors to execute instructions, one or more memories to store information, one or more data input components to receive data input from a user of the mobile computing device, one or more modules that include the card module, a communication circuit to establish a communication link to communicate with other computing devices external to the mobile computing device, a display screen to display at least some of the information stored in the one or more memories, and a battery to power the mobile computing device.

The card module is configured to present a user interface with one or more cards that each correspond to a different category of content. The card module is configured to present a software object structured as card (herein after a 'card') to showcase content on the display screen from any of i) two or more apps resident in the memories of the mobile computing device and ii) one or more apps resident in the memories as well as other content supplied from the other computing devices, such as a wearable electronic device, a server on the internet, etc., external to the mobile computing device, which is all aggregated on the card. The user gets to see content from these apps and other external content on the card all displayed on the user interface of that card, which makes the content from these apps and/or other content more visible on the display screen of the mobile computing device. Thus, the user need not launch multiple apps and perform multiple clicks to find this relevant information within each app but rather review the aggregated content on a corresponding card. The user interface also presents a configuration screen configured to allow the user of the mobile computing device to customize and personalize their own user experience on the mobile computing device. The user of the mobile computing device can select as potential content sources from both the apps and the external computing devices to supply an extracted newest feed of content from that source to be aggregated and displayed on a corresponding card in order to personalize and provide better engagement with the user of the mobile computing device. Thus, the card module cooperating with the configuration screen allows the user's customization to make more efficient use of computing cycles of the processors to view aggregated content on the first card rather than launching multiple apps to find the content of interest in each of the apps.

These and other features of the design provided herein can be better understood with reference to the drawings, description, and claims, all of which form the disclosure of this patent application.

DRAWINGS

The drawings refer to some embodiments of the design provided herein in which:

FIGS. 6A and 6B illustrate diagrams of an embodiment of a card module configured to present four or more cards to provide the large diversity of categories of cards.

FIG. 7 illustrates a diagram of an embodiment of the card module in a mobile computing device cooperating with an analytics module in a backend cloud platform.

FIGS. 9A-9C illustrate diagrams of an embodiment of a method of presenting at least four categories of cards to provide a large diversity of categories to more accurately group similar content from the apps and the other external content into a corresponding appropriate card.

FIGS. 10A-10C illustrate diagrams of an embodiment of method with the cards to customize and personalize the user experience.

Figure 1A:
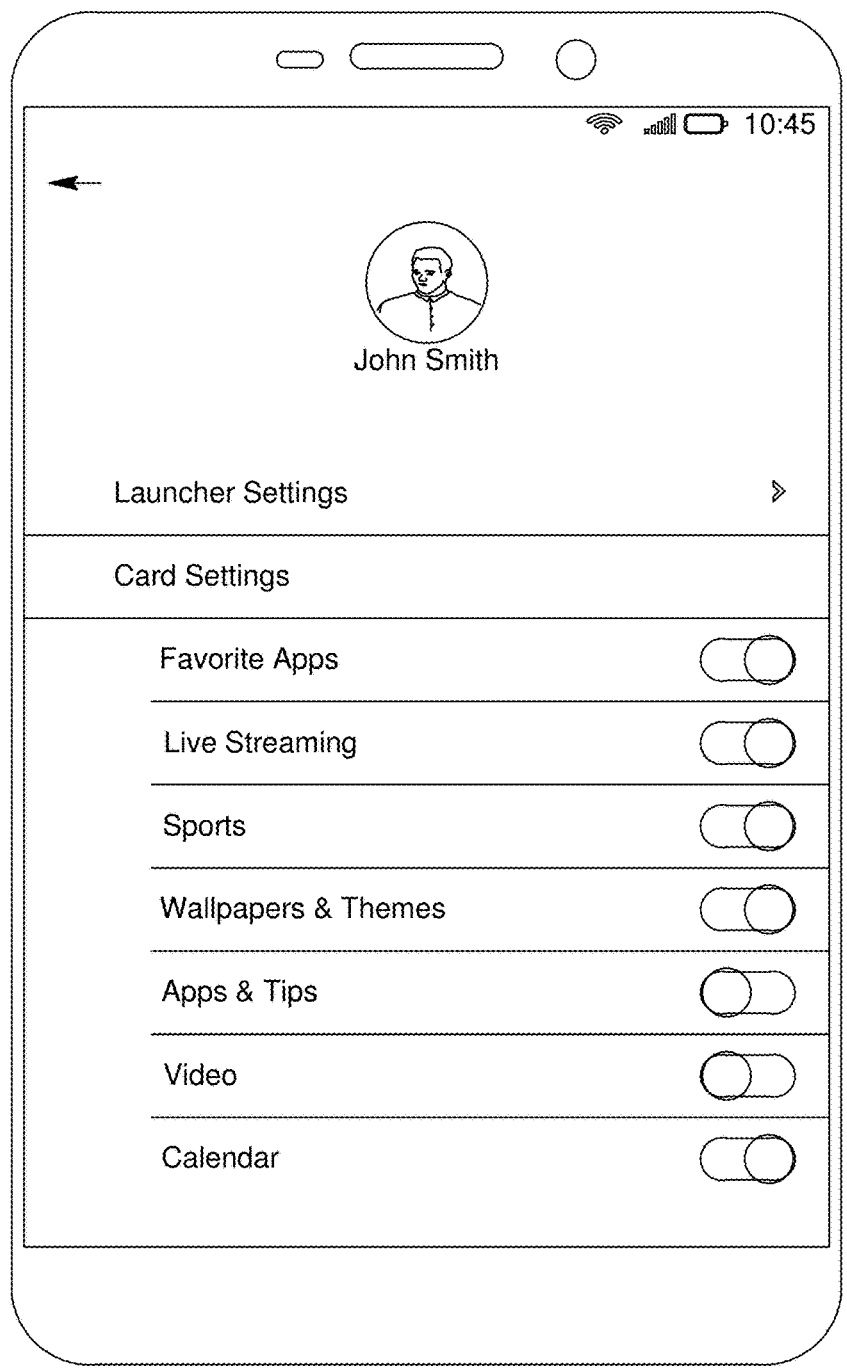
FIGS. 1A through 1C illustrate diagrams of an embodiment of a home screen, a card screen, and a settings screen.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of memories in a device, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as first notification, can be made. However, the specific numeric reference should not be interpreted as a literal sequential order but rather interpreted that the first notification is different than a second notification. Thus, the specific details set forth are merely exemplary. The specific details can be varied from and still be contemplated to be within the spirit and scope of the present design. The term coupled is defined as meaning connected either directly to the component or indirectly to the component through another component. Also, an application herein described includes software applications, mobile apps, programs, and other similar software executables that are either stand-alone software executable files or part of an operating system application.

Figure 8:
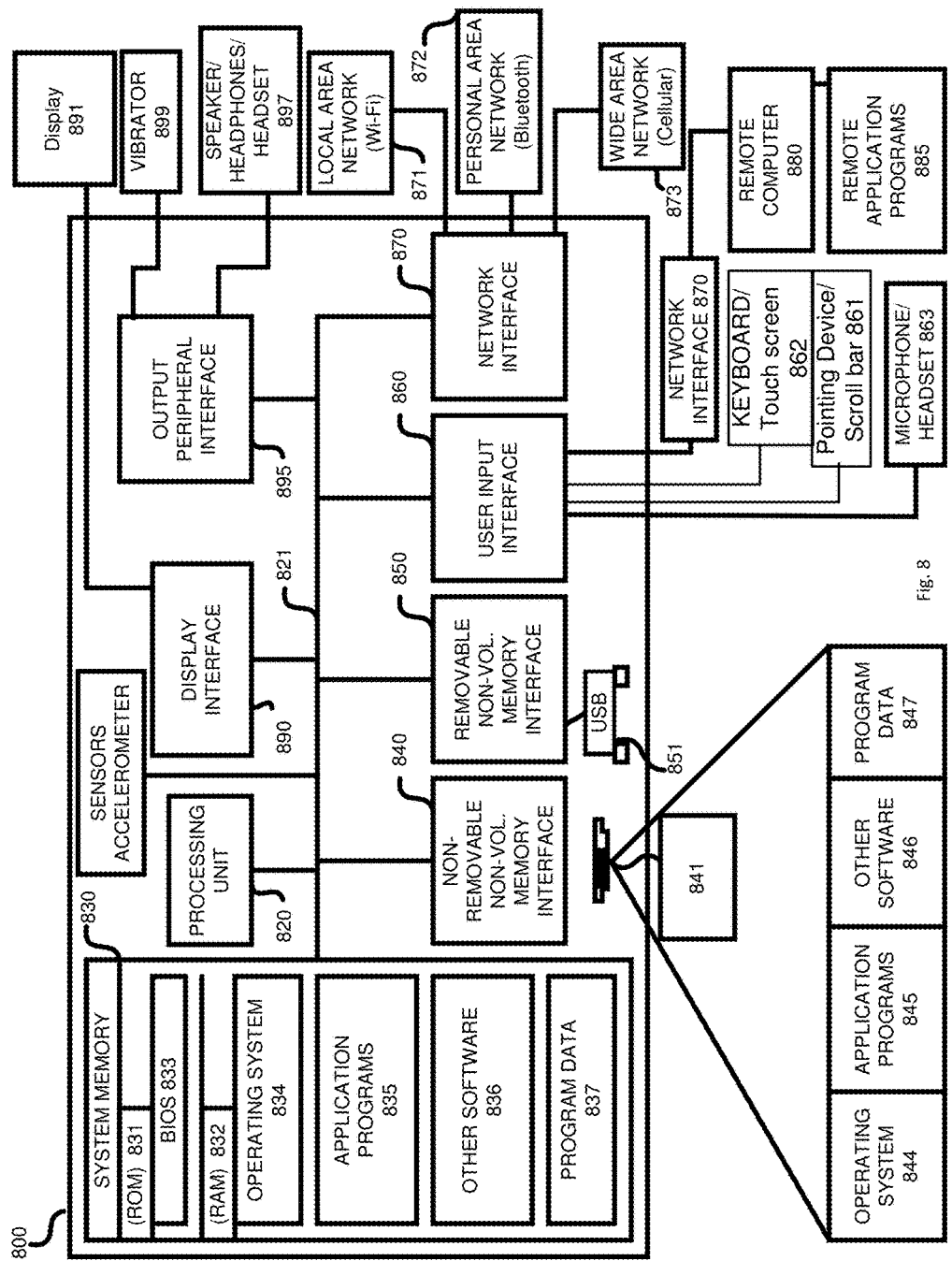
FIG. 8 illustrates a diagram of an embodiment of a card module in a computing device platform.

Unless defined otherwise, all technical and scientific terms used herein have the same meaning as commonly understood by persons of ordinary skill in the art. FIG. 7 and FIG. 8 show example devices where the concept discussed herein may be practiced.

In general, some embodiments discussed are an apparatus, system, and methods describing aspects of the card concepts. For example, a method may be performed. Two or more cards are presented that each correspond to a different category of content. Each card uses one or more application programming interfaces to actively pull content or have content pushed from any of i) two or more apps resident in memories of the mobile computing device and ii) one or more apps resident in the memories as well as other content supplied from computing devices external to the mobile computing device. Each card is particularized to a specific category of information to showcase content on a display screen of the mobile computing device from the apps and the other external content, which are all aggregated on a corresponding card for that category of information. A configuration screen is also presented to allow the user of the mobile computing device to customize their own user experience on the mobile computing device by selecting as potential content sources from the apps and the external computing devices to supply an extracted newest version of content to be displayed on the one or more cards to personalize content and provide better engagement with the user of the mobile computing device.

Figure 1B:
Figure 1C:
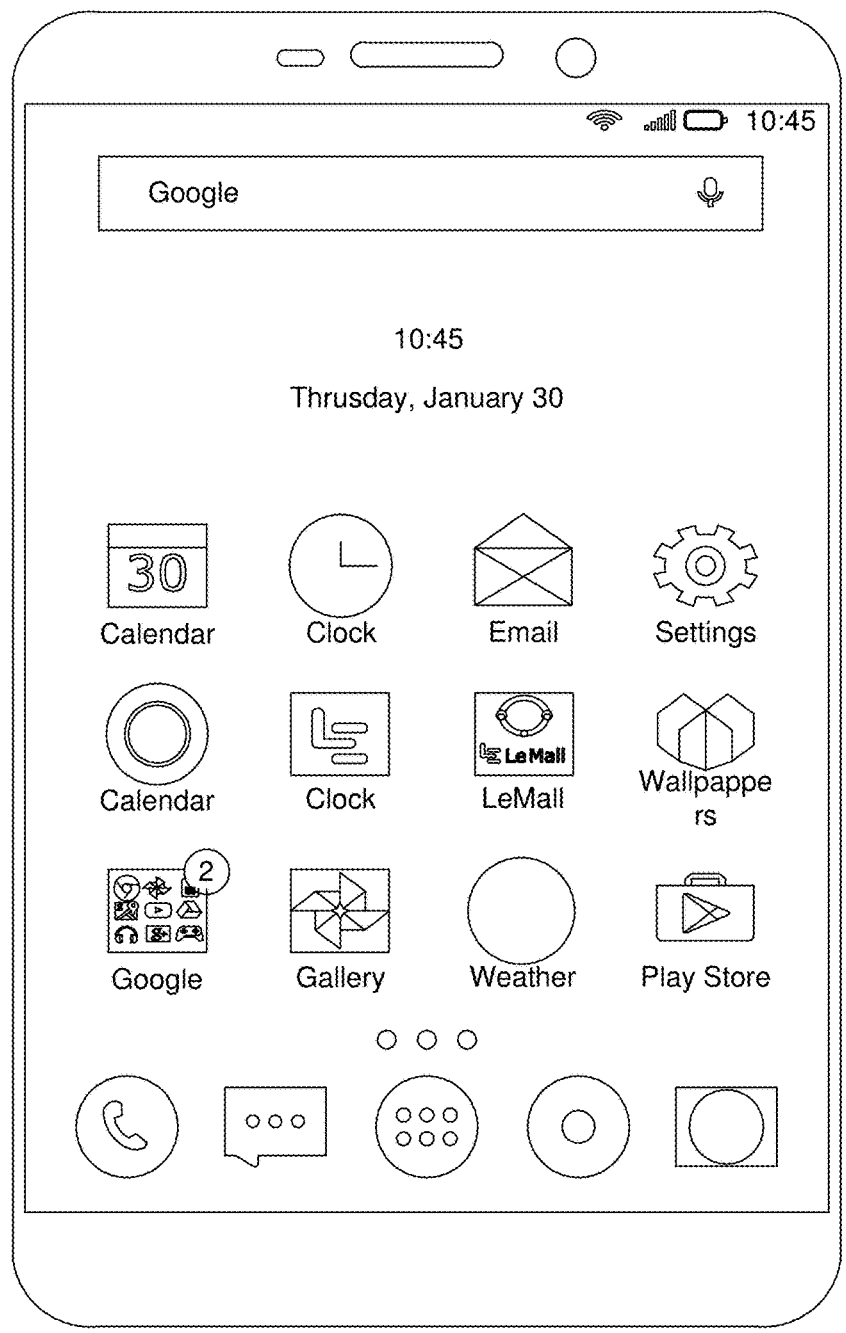

FIGS. 1A through 1C illustrate diagrams of an embodiment of a home screen, a card screen, and a settings screen. Multiple cards are usually present on one screen called a card screen.

On FIG. 1B, the card screen 10 contains two or more cards including a favorite apps card, a notes card, and a wallpaper and themes card.

On FIG. 1A, the settings screen 20 has a settings screen configured to allow the user to launch settings menus and windows to customize their experience with the mobile computing device via the cards.

On FIG. 1C, the home screen is typically the first screen that is opened up when the device is turned on. The typical home screen typically has app icons, app shortcuts folders, and various widgets presented on the typical home screen. The typical home screen allows access to all the installed apps.

Each card can be accessed from the home screen 30 via one or more operations including i) a horizontal or vertical finger swipe on the display screen through a first data input component, ii) a cursor arrow input on the home screen 30 on the display screen through a first data input component, iii) a voice command received via a microphone data input component and a speech recognition application input to the card module, iv) an arrow key depression on an icon on the home screen on the display screen through the data input component, v) a depression of a push button to an option presented by the card module; vi) gesture, and vii) any combination of these.

Each card past the initial set of cards appearing in the display screen is, likewise, accessed to via any operation selected from the group consisting of i) a horizontal or vertical finger swipe on the display screen through the first data input component, ii) a cursor arrow input on the home screen 30 on the display screen through the first data input component, iii) a voice command received via a microphone data input component and a speech recognition application input to the card module, iv) an arrow key depression on an icon on the home screen on the display screen through the first data input component; v) a depression of a push button to an option presented by the card module; and vi) any combination of these. For example, additional cards screens past the wallpaper and themes card can be accessed via scrolling vertically downward on this screen.

In an embodiment, the initial set of cards is accessed via a user's swipe right from the home screen. Further, card are accessed via a horizontal or vertical finger swipe on the display screen as well as through a cursor arrow input on the card screen 10 on the display screen through the data input component. Each card showcases content from the apps and other external content sources for your mobile computing device. The cards break boundaries between individual apps and external content so the user gets to see similar content higher up making the similar content more visible on the device via extracting the newest feed and version of the content from the apps and external content.

A card module may present multiple cards on the card screen 10. The card module may have one or more application program interfaces to the apps resident in the memories as well as one or more application program interfaces to other external computing devices, such as a wearable electronic device, other mobile devices, electric bicycles, smart vehicles, sensors, a server on the internet, partner servers, third party public servers, etc., all external to the mobile computing device. The application programming interfaces can pull or have pushed the new and relevant content to a corresponding card. Thus, the one or more application program interfaces for the cards are configured to allow a corresponding card to break boundaries between the different apps and the other content so the user gets to see content from these apps and the other external content, which is all aggregated and displayed on the corresponding card. This makes the content from these apps and other content more visible on the display screen of the mobile computing device.

The card module is configured to maintain a set of one or more application programming interfaces that at least includes application programming interfaces to the two or more apps that come pre-installed on the mobile device as well as application programming interfaces to one or more of the other computing devices external to the mobile device. Thus, one or more of the apps resident in the mobile device can each have an application programming interface set up to extract the most recent content from that app. Generally, the apps that come as default on the device have the application programming interfaces set up. Later, more application programming interfaces can be downloaded from a support server in the cloud.

The user interface presents a configuration/setting screen configured to allow the user of the mobile computing device to customize their own user experience on the mobile computing device by selecting as potential content sources from both the apps and the external computing devices to supply a given card. The selected apps and external computing devices supply an extracted newest feed of content to be displayed on the corresponding card. Each card can come with a default set of content sources supplying that card, which the user via the settings module can add content sources to or delete content sources from the default content sources for that card. The card module cooperating with the configuration screen allows the user to personalize content and provide better engagement with the mobile computing device. Thus, the card module cooperating with the configuration screen allows the user's customization to make more efficient use of computing cycles of the processors to view aggregated content on the first card rather than launching multiple apps to find the content of interest in each of the apps.

Each user can customize the cards to provide a feed of information from i) apps on the device, ii) information from servers of cloud based services, iii) third party partner feeds, and iv) other selected content sources, all on the same screen in order to make a more efficient and enjoyable smart phone experience. The user quickly gets a more complete picture of this category of information from these multiple content sources all being displayed on a corresponding card.

As discussed, the card module is configured to present a user interface with one or more cards that each correspond to a different category of content. The card module is configured to present multiple cards. Each card showcases content on the display screen from any of the i) two or more apps resident in the memories of the mobile computing device and ii) one or more apps resident in the memories as well as other content supplied from the other external computing devices, such as a wearable electronic device, a server on the internet, etc., external to the mobile computing device all aggregated on that card. The other content from the external computing device may include but is not limited to an extracted newest feed/version of content from stock and other financial markets, sports scores, online auction houses, social media sites, etc.

The card module presents two or more cards that each correspond to a different category of content. The card aggregates content from multiple different sources and presents that content in one place. As discussed, each card may have its own one or more application programming interfaces to actively pull content or have content pushed from any of i) two or more apps resident in the local memories of the mobile computing device and ii) one or more apps resident in the memories as well as other content supplied from the other external computing devices, such as third party sources such as business entities, and other organizations. Each card aggregates similar content from these multiple different sources and cooperates with an analytics module to personalize and suggest what content sources are the best to use, based on both i) a user profile particular for that user and ii) generalized user behavior data gathered from a population of users. The card module cooperating with the settings module allows the user to customize many things including but not limited to the sources of the content, the presentation order of cards, enablement of an amount of cards displayed by the device, etc.

The set of screen cards include two or more categories of content from apps and/or content from other computing devices. The example categories of the set of screen cards include i) a category that give date, time, and weather, ii) a category that supply audio content including music, iii) a category that supply sports news and scores, iv) a category that supplies themes and wallpaper, v) a category that supplies videos file content, vi) a category that supplies calendaring, vii) a category for gaming apps, viii) a category that supplies device status application, ix) a category that supplies email potentially aggregated from all of the user's e-mail accounts, x) a category that supplies SMS and/or instant messaging texts, xi) a category that supplies social media content potentially aggregated from all of the user's social media accounts, xii) a category that supplies relevant information on geographically nearby places and businesses, xiii) a category that supplies other content, xiv) etc.

In an embodiment, a launcher application may include the settings module, the card module, a home screen module, a screen manager module, and an app drawer module. The launcher application can be i) part of or ii) operates on top of an operating system layer of the mobile computing device. The launcher application incorporates and supports the two or more cards and the setting module to assist a user of the end device customizing multiple features of their mobile computing device, including the presentation order of cards, content sources in each category of card supplying content to that card, etc.

On the customized theme specific card, swiping down from the top section would automatic launch the theme specific apps, instead of having to locate the app in order to launch it. For example, if it's a card geared towards my favorite food, swiping down the top section could launch the Yelp app.

On the settings screen, the user may use launch settings menus and windows to enable or re-enable the display of individual cards. The individual cards each representing a category of information may include a favorite apps card, a live streaming card, a sports card, a wall paper and themes card, an apps and tips card, a video card, a calendar card, and other similar cards. The user may be able to access a global launch in the settings from the settings screen. The user may be able to rearrange the presentation order of cards on the card screen(s) from the settings screen, set individual cards and/or the card screen 10 as a home screen, and set various themes and wallpapers from the settings screen.

On each card, the user may expand and collapse a size of that individual cards on the card screen. The user may quickly review and interact with content on each card. The card module is coded so that the user viewing the card may interact with the content being displayed on the card through the data input component. For example, the user may click through promoted content via deep links on that card. The card module is coded so that the user may also launch associated apps from each card and shortcut icons displayed on that card. The user may quickly review content and compare the different content from multiple similar content sources all on that card.

The card module is configured to cooperate with components on the mobile computing device that include one or more processors to execute instructions, one or more memories to store information, one or more data input components to receive data input from a user of the mobile computing device, one or more modules that include the card module, a communication circuit to establish a communication link to communicate with other computing devices external to the mobile computing device, a display screen to display at least some of the information stored in the one or more memories, and a battery to power the mobile computing device. (For example, see FIG. 8).

Figure 2A:
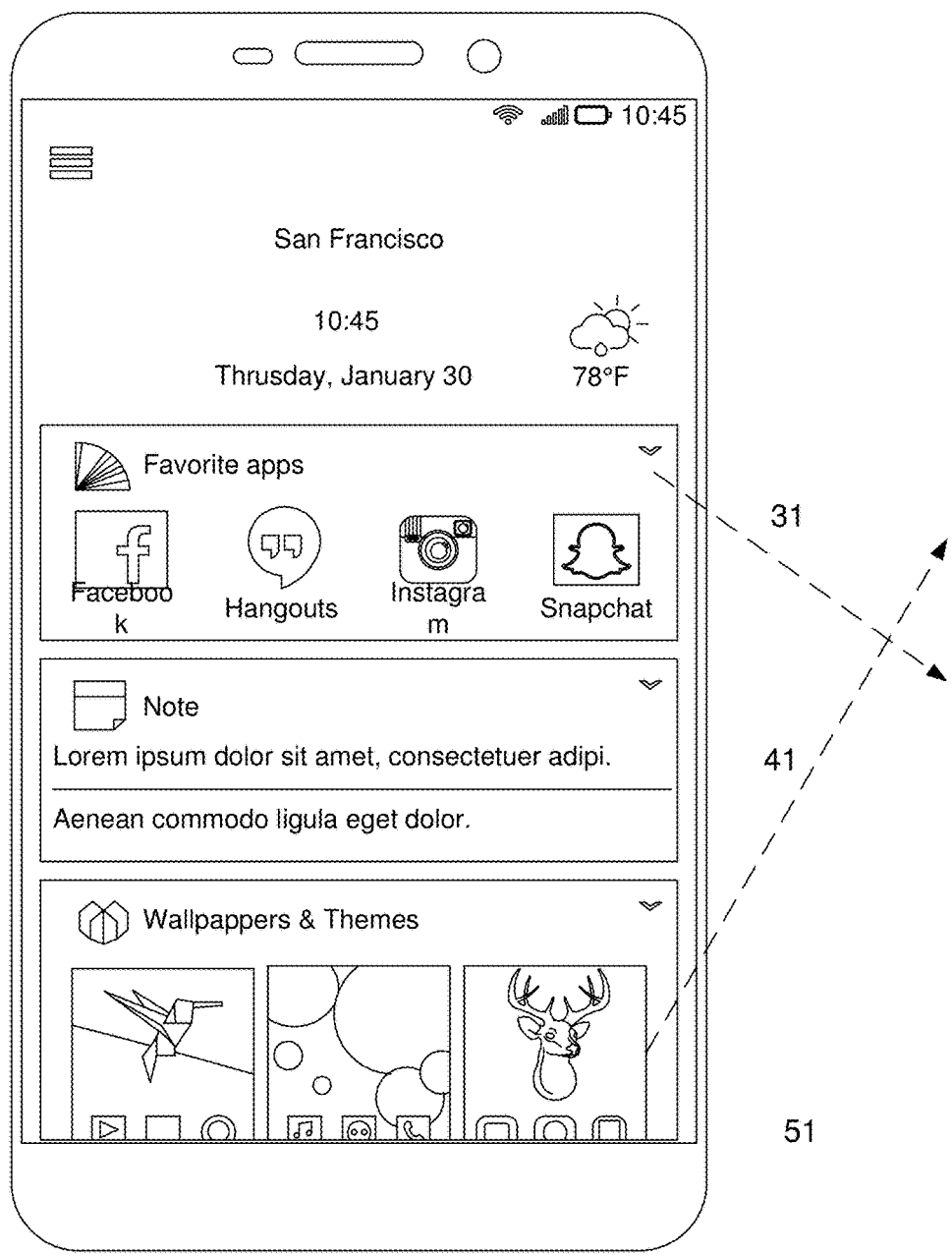
FIG. 2A illustrates a diagram of an embodiment of a card module presenting a card screen containing four or more cards.
Figure 2B:
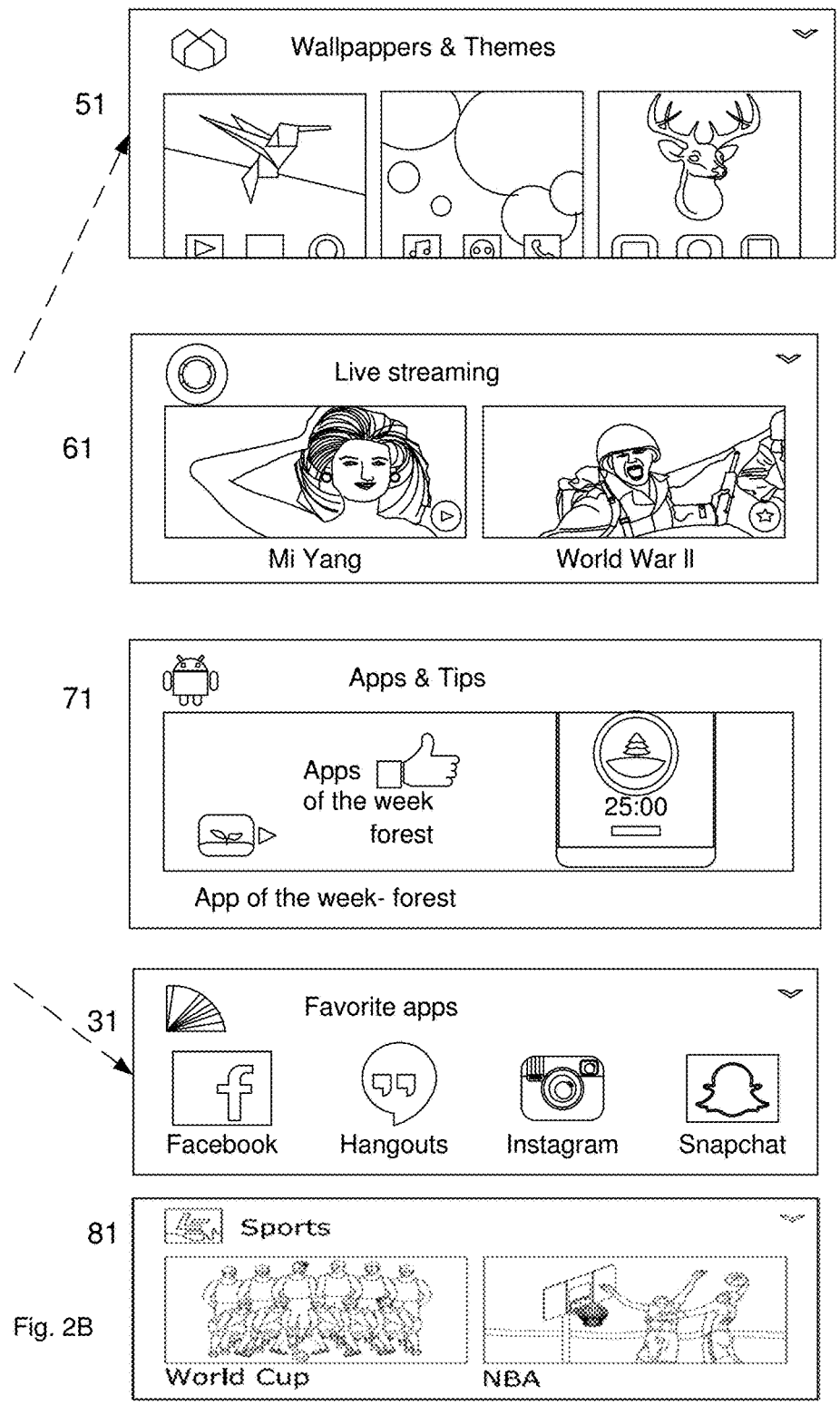
FIG. 2B illustrates a diagram of an embodiment of changing one or more cards position in presentation order, relative to each other.

FIG. 2A illustrates a diagram of an embodiment of a card module presenting a card screen containing four or more cards. 3 cards are shown in FIG. 2A and more presented cards are navigated to by scrolling downward on the card screen. The card screen contains the favorite apps card 31, a notes card 41, and a wallpaper and themes card 51, all presented on the display screen. Referring to FIG. 2B, the user may view additional individual cards screens on the card screen such as Live Streaming card 61, Apps and Tips card 71, a sports card 81, etc. (See FIG. 2B) via horizontal scrolling.

Each card uses one or more application programming interfaces to actively pull content or have content pushed from any of i) two or more apps resident in memories of the mobile computing device and ii) one or more apps resident in the memories as well as other content supplied from the other computing devices external to the mobile computing device. These multiple content sources have their relevant content extracted or push content on a corresponding screen card. Thus, each card is particularized to a specific category of information to showcase content on a display screen of the mobile computing device from the apps and the other content all aggregated on a corresponding card for that category of information.

The card module presents at least four or more categories of cards to provide a large diversity of categories to more accurately group similar content from the apps and the other content into a corresponding appropriate card, which will improve the user's experience and an efficiency of the mobile computing device.

Each card is indexed in detail to receive and display content in different fields and windows of this software object. The user gets to see content from these apps and other external content on the card all aggregated and displayed on the user interface of the card, which makes the content from these apps and/or other content more visible on the display screen of the mobile computing device.

The card module generally displays the set of cards as i) a default roster of different categories of content cards ii) in a default a presentation order of how the cards are displayed. However, both aspects of the card can be customized based on the user's supplied guidance, personal interest of that user from a user account profile built by the analytics module, and a current geographic location of that user at the particular time when the card is being viewed. Note, the current geographic location can be updated based on the GPS location of the mobile device at the time that the user accesses the card and then periodically afterwards for updates.

FIG. 2B illustrates a diagram of an embodiment of changing one or more cards position in presentation order, relative to each other. For example, the criss crossing lines shown in FIGS. 2A and 2B illustrate two card screens changing in their presentation order.

The configuration screen is configured to cooperate with a touch screen module of the display screen to allow a user to drag their finger on the display screen as a way to raise or lower a particular card being dragged by the finger in the presentation order of the cards. On FIG. 2A, the current presentation order is the favorite apps card 31, a notes card 41, and a wallpaper and themes card 51. The configuration screen is also configured to present a roster screen listing all of the possible cards and then the user may individually designate each card's position in the presentation order of the cards. The different one or more cards are positioned in presentation order, relative to each other, in either i) a vertical stack of cards, ii) a horizontal stack of cards, or iii) a combination of both. Thus, the user may reorder the one or more cards in presentation order i) via simply dragging the particular card into the position within the set of currently presented cards with their finger on the display screen and/or ii) via a configurable setting in the settings module. On FIG. 2B, for example, the user may raise the wallpaper and themes card 51 to the top of the presentation order while lowering the favorite app card 31 down in presentation order on the card screen.

Figure 3A:
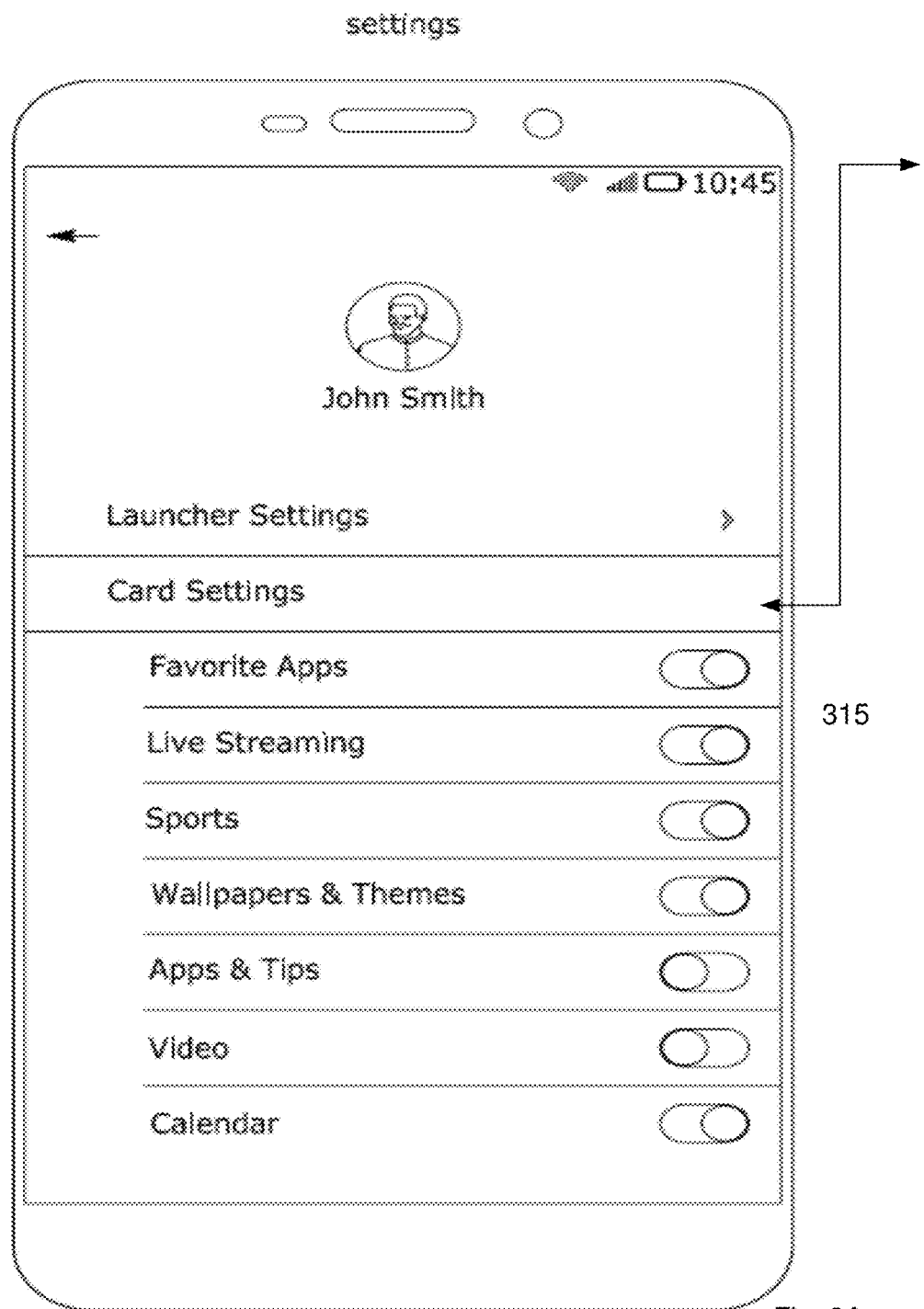
FIGS. 3A and 3B illustrate diagrams of an embodiment of a settings module presenting a configuration screen that cooperates with a card module presenting one or more cards to allow the user to personalize aspects of the one or more cards.
Figure 3B:
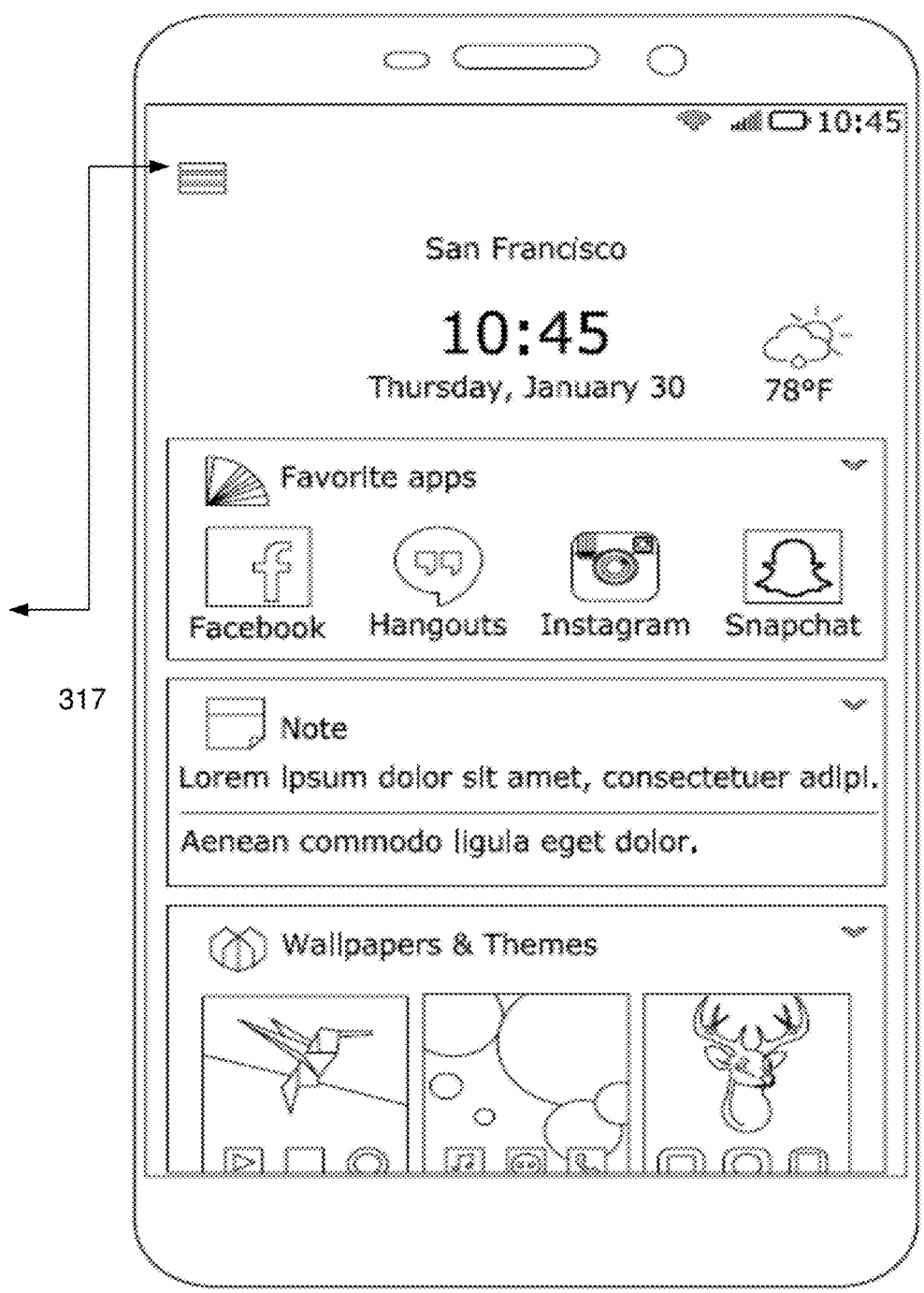

FIGS. 3A and 3B illustrate diagrams of an embodiment of a settings module presenting a configuration screen that cooperates with a card module presenting one or more cards to allow the user to personalize aspects of the one or more cards.

The configuration screen 315 is configured to allow the user of the mobile computing device to customize their own user experience on the mobile computing device by customizing two or more aspects of the one or more cards on the card screen 317. The customized two or more aspects of the one or more cards may be any of the following i) the selecting of content sources of the apps and the other content sources to feed a particular card, ii) an arranging of a presentation order of the different categories of cards, iii) an enablement of a total amount of cards displayed by the user interface, iv) a setting of the one or more cards as the default home screen that the mobile computing device initially presents for display after turning on, v) other similar aspects discussed herein, and vi) any combinations of these. In an embodiment, the card module is configured to cooperate with an analytics module to assist the user of the mobile computing device in customizing three or more aspects of the one or more cards. For some users, the more customization the better the experience they will have and for other users, a small amount of customization may be preferred.

The configuration screen 315 is configured to present a roster screen listing of all possible cards and their associated icon in which the user may individually select to enable or disable that card for display on the display screen via the associated icon for each card. For example, the roster screen listing of possible cards on the settings screen may include a favorite apps card, a live streaming card, a sports card, a themes and wallpaper card, an apps and tips card, a video card, a calendaring card, and many others. Next to each listed card is the associated icon in which the user may individually select to enable or disable that card for display.

In addition, the card module is configured to establish communication links with and cooperate with the configuration screen, a GPS module, and one or more third party servers to present any of a screen, drop down menu, or a pop up window to allow the user to customize their user experience by selecting i) to opt in or ii) not opt in to receive communications, including but not limited to notifications of best deals, nearby places, coupons from the internet or from the third party server, promotions, and other suggestions, when geographically near the third party's establishment.

Figure 4:
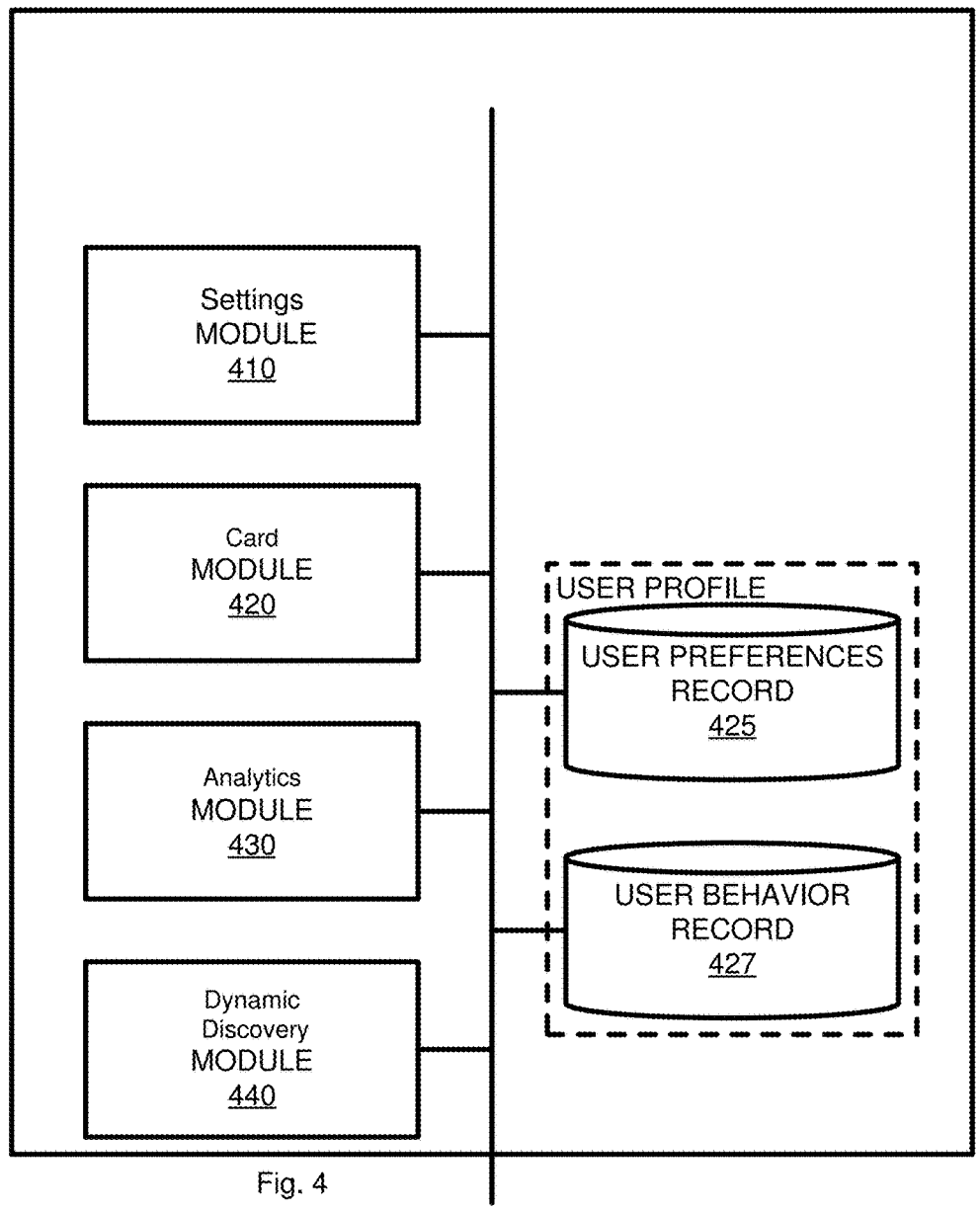
FIG. 4 illustrates a diagram of an embodiment of a device having multiple modules cooperating to present customized cards.

FIG. 4 illustrates a diagram of an embodiment of a device having multiple modules cooperating to present customized cards. The various modules, a settings module 410, a card module 420, an analytics module 430, and a dynamic discovery module 440 are configured to cooperate to make a user profile that includes recorded user preferences 425 as well as actual recorded user behavior 427.

A data collection routine of the card module 420 is configured to collect data and send the data to the analytics module 430 to build a user behavior profile of a user of the mobile computing device.

The card module 420 may be configured to cooperate with a dynamic discovery module 440 to analyze and discover a type of app resident in the memories of the mobile computing device. The dynamic discovery module 440 may use an app's name and other Meta data associated with that app and then reference the name and the Meta data to information categorized on potential known existing apps recorded in a database or table. The dynamic discovery module 440 may also use what type of content is associated with the discovered app in order to discover and identify a type of new app resident in the memories. The identified new app helps the card module 420 and analytic module 430 aggregate and display content from that app into a corresponding category of card when chosen by the user to be one or the selected sources of content for that category of card.

The card module 420 is configured to cooperate with a dynamic discovery module 430 to analyze a population of potential apps available in an app store and supply app recommendations based on any of the following selected from the group consisting of i) user profile information on this particular user, ii) frequency of use of certain apps of this particular user, iii) browsing habits of this particular user, and iv) apps being used by other users with similar user profiles.

Figure 5:
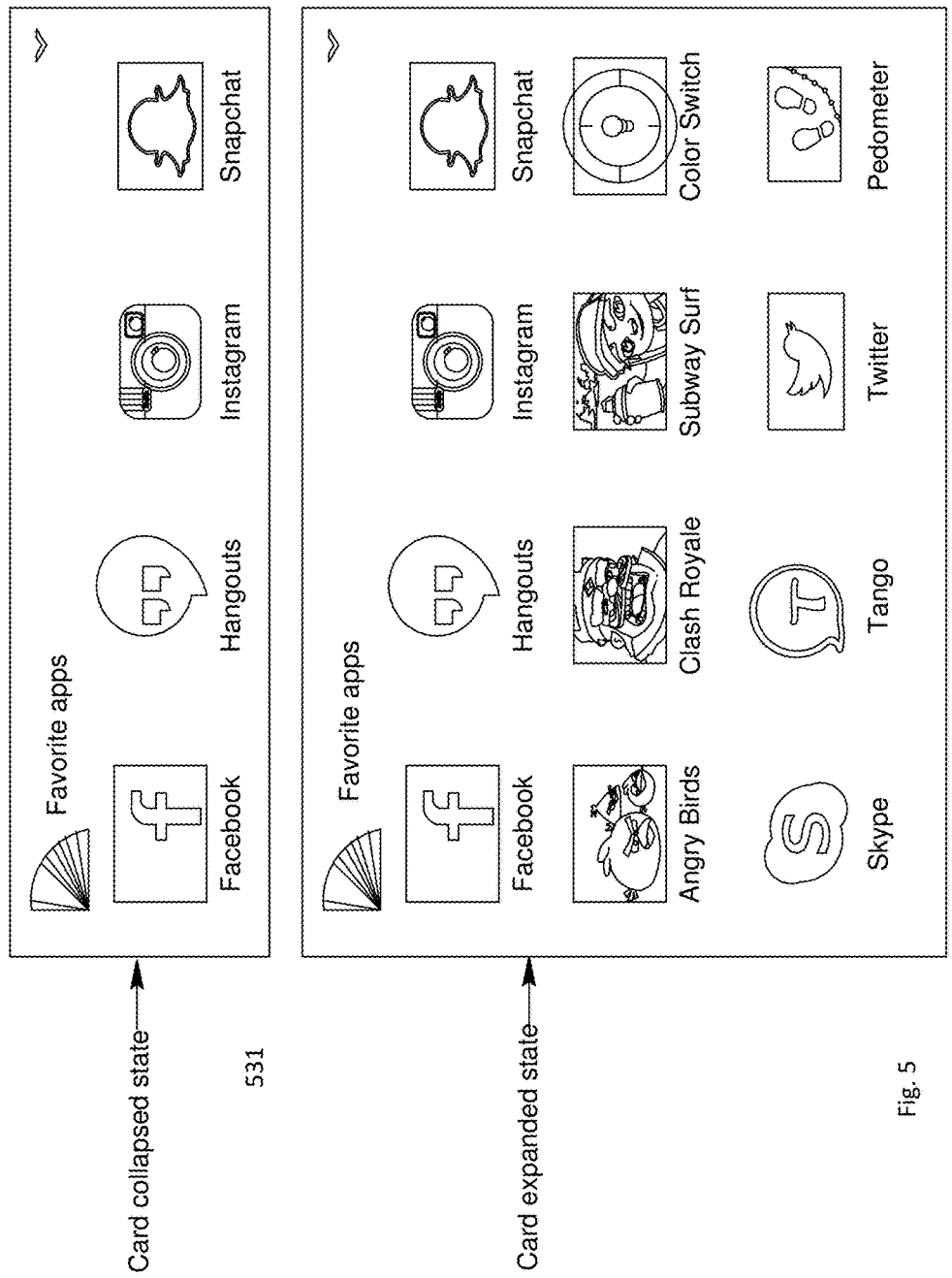
FIG. 5 illustrates a diagram of an embodiment of a card expanding from a collapsed window size state to an expanded window size state.

FIG. 5 illustrates a diagram of an embodiment of a card expanding from a collapsed window size state to an expanded window size state. The user may press on an arrow icon on the right side of the card, for example on the favorite apps card 531, to expand or collapse the size of that screen card. Each card is configured to expand or collapse that screen card into a collapsed window size state to show a subset of information or into an expanded window size state to show a fuller set of information on that card from a single data structure containing an entire set of information by resizing the size of a window displaying the content within the card.

Note, in an embodiment, each card merely uses a single data structure as a source for the set of information and this causes a smoother animation transition on the display screen to show the displayed content from the single data structure rather than drawing content from two or more data structures and then switching the display of those data structures, each containing their own set of information being displayed in the window. Jitter might occur when switching between presenting the two or more data structures. In an embodiment, each card may actually be a composition of multiple data structures as a source for the set of information being displayed.

The card user interface may also be put into an expanded state to show a full set of information on that card by finger dragging on the side of the presented card or thru other mechanisms of input such as button depression, taps of the finger, voice commands, etc. Note, in an embodiment, the card in a collapsed state may show notifications, summaries, and/or narratives of the full set of information of an item of content contained in the card.

FIGS. 6A and 6B illustrate diagrams of an embodiment of a card module configured to present four or more cards to provide the large diversity of categories of cards.

The card module is configured to present the four or more cards, each tailored to a specific category 600A & 600B to in order provide the large diversity of categories to allow a tighter grouping of similar content; and thus, better user experience.

The e-mail card aggregates and displays a card category of content coming from the apps and from the other external computing devices that supply e-mail communications including a most recent e-mail messages received in an inbox of a given e-mail account from potentially across multiple e-mail accounts of that user.

A date card aggregates and displays a card category of content coming from the apps and from the other external computing devices that supply date information, time information, and weather information, including a current date, a current time at the mobile computing device's current geographic location, current weather conditions at the mobile computing device's current geographic location.

An audio card aggregates and displays a card category of content coming from the apps and from the other external computing devices that supply audio content, including music, including two or more most recent audio tracks played. The third card cooperates with an audio player routine and a speaker.

A sports card aggregates and displays a card category of content coming from the apps and from the other external computing devices that supply sports related content including sports news and sports scores.

A themes content and wallpaper card aggregates and displays a card category of content coming from the apps and from the other external computing devices that supply themes content and wallpaper content including two or more of i) the latest themes and wallpapers used by the mobile computing device or ii) themes and wallpapers marked by the user to highlight.

A news card aggregates and displays a card category of content coming from the apps and from the other external computing devices that supply links or portions of recent news articles based on interests indicated by a user profile maintained for the user of this mobile computing device.

A live card aggregates and displays a card category of content coming from the apps and from the other external computing devices that supply live content including recently played live-streamed content and two or more featured channels.

A calendar card aggregates and displays a card category of content coming from the apps and from the other external computing devices that supply calendaring information including items in today's calendar from one or more calendar sources of that user.

A gaming card aggregates and displays a card category of content coming from the apps and from the other external computing devices that supply gaming information including gaming apps, partner game promotions, and game content.

A device status card aggregates and displays a card category of content coming from the apps or components on the mobile computing device selected from a group consisting of Battery percentage left, RAM Usage, Storage Used/Available. The card module cooperates with the battery and the memories to obtain some details about these components.

A messages card aggregates and displays a card category of content coming from the apps and from the other external computing devices that that supply messages selected from a group consisting of SMS text messages, instant messaging texts, and notifications from websites including auction websites.

A social media card aggregates and displays a card category of content coming from the apps and from the other external computing devices that supply social media content.

A places nearby card aggregates and displays a card category of content coming from the apps and from the other external computing devices that supply relevant information on geographically nearby places and businesses via one or more links to online sites that search for restaurants, shopping, or transit near a current location of the mobile device.

A favorite apps card aggregates and displays a card category of a collection of app shortcuts to launch the favorite apps as well as most recently used apps by the user.

An apps and tips card aggregates and displays a card category of apps and tips that includes two or more most recent tips or app recommendations from an analytics module using a user profile.

A video card aggregates and displays a card category of content coming from the apps and from the other external computing devices that supply video content selected from the group consisting of recently played videos file content, two or more popular videos, as well as favorite videos.

A notes card aggregates and displays a card category of notes from the user to themselves.

A community card aggregates and displays a card category of latest community posts across two or more device platforms device platforms, selected from a group consisting of a smart phone, a laptop, an entertainment system in a vehicle, a television, and a wearable electronic device, configured to display the four or more cards.

Each card past the initial card on the card screen can be accessed to via any operation selected from the group consisting of i) a horizontal or vertical finger swipe on the display screen through the data input component, ii) a cursor arrow input on a card screen on the display screen through the data input component, iii) a voice command received via a microphone data input component and a speech recognition application input to the card module, iv) an arrow key depression on an icon on the card screen on the display screen through the data input component, v) a depression of a push button to an option presented by the card module, and vi) any combination of these.

Network

FIG. 7 illustrates a diagram of an embodiment of the card module in a mobile computing device cooperating with an analytics module in a backend cloud platform. In an embodiment, the analytics module is implemented in the backend cloud, on solely the mobile device, or a cooperating portions of the analytics module are implemented on both the mobile device and in the backend cloud.

In FIG. 7, a number of electronic systems and devices communicate with each other in a network environment in accordance with some embodiments. The network environment 100 has a communications network 220. The network 220 can include one or more networks selected from an optical network, a cellular network, the Internet, a Local Area Network (LAN), a Wide Area Network (WAN), a satellite network, a fiber network, a cable network, and combinations thereof. In some embodiments, the communications network 220 is the Internet. As shown, there may be many server computing systems and many client computing systems connected to each other via the communications network 220. However, it should be appreciated that, for example, a single client computing system can also be connected to a single server computing system. As such, FIG. 7 illustrates any combination of server computing systems and client computing systems connected to each other via the communications network 220.

The communications network 220 can connect one or more server computing systems selected from at least a first server computing system 204A, a second server computing system 204B, and a third server computing system 204C to each other and to at least one or more client computing systems as well. The server computing systems 204A, 204B, and 204C can respectively optionally include organized data structures such as databases 206A, 206B, and 206C. Each of the one or more server computing systems can have one or more virtual server computing systems, and multiple virtual server computing systems can be implemented by design. Each of the one or more server computing systems can have one or more firewalls to protect data integrity.

The at least one or more client computing systems can be selected from a first mobile computing device 202A (e.g., smartphone with an Android-based operating system), a second mobile computing device 202E (e.g., smartphone with an iOS-based operating system), a first wearable electronic device 202C (e.g., a smartwatch), a first portable computer 202B (e.g., laptop computer), a second portable computer 202D (e.g., laptop computer), and a third mobile computing device or third portable computer 202F (e.g., tablet with an Android- or iOS-based operating system). Each of the one or more client computing systems can have one or more firewalls to protect data integrity.

It should be appreciated that the use of the terms "client computing system" and "server computing system" is intended to indicate the system that generally initiates a communication and the system that generally responds to the communication. For example, a client computing system can generally initiate a communication and a server computing system generally responds to the communication. No hierarchy is implied unless explicitly stated. Both functions can be in a single communicating system or device, in which case, the client-server and server-client relationship can be viewed as peer-to-peer. Thus, if the first mobile computing device 202A (e.g., the client computing system) and the server computing system 204A can both initiate and respond to communications, their communications can be viewed as peer-to-peer. Likewise, communications between the one or more server computing systems (e.g., server computing systems 204A and 204B) and the one or more client computing systems (e.g., client computing systems 202A and 202C) can be viewed as peer-to-peer if each is capable of initiating and responding to communications. Additionally, the server computing systems 204A, 204B, and 204C include circuitry and software enabling communication with each other across the network 220.

Example Embodiment

In an embodiment, a card module in each computing device cooperates with an analytics module in a backend cloud platform in the following manner.

The card module in a mobile computing device 202A collects and sends application analytics, Operating System level analytics, and user behavior and then reports these to the analytics module in a server 204A of the backend cloud platform. The analytics module may capture customer behavior from multiple touch points of card modules across multiple platform devices, including a card module in any of the mobile computing devices 202A-202F, and then attach the captured customer behavior into the end user's customer profile stored in the cooperating database 206A. The analytics module provides real-time analysis and tailored segmentation of customers to personalize content being viewed on the cards of their device platform.

A data collection routine in the mobile computing device 202A is configured to collect user behavior on the mobile computing device 202A and send this information to an analytics module. The analytics module receives data on the user's behavior and stores this data. The analytics module cooperates with the card module to collect and store the data to form the user profile. The analytics module may be further configured to gather customer usage analytics and insights across the multiple apps and the other device platforms. The analytics module after gathering these analytics and insights then builds a robust and well-rounded user profile personalized to that user of the mobile computing device.

The analytics module may be located within the mobile computing device 202A, or located in a sever 204A in the backend cloud site, or a portion exists in both locations. In an embodiment, the backend cloud-based analytics module is configured to gather customer usage analytics and insights across the multiple applications and other computing devices.

In an embodiment, the data collection routine in the mobile computing device 202A is configured to collect user behavior on the mobile computing device 202A and sends this information through the communication circuit to the analytics module. The analytics module receives data on the user's behavior from at least one other device platform to assist forming the user profile on the user. The analytics module gathers customer usage analytics and insights across the multiple applications as well as across multiple device platforms selected from the group consisting of TV usage, Internet usage, electric bicycles, in-vehicle entertainment system usage, and shopping habits. The analytics module then builds a robust and well-rounded user profile personalized to that user of the mobile computing device based on the insights. Thus, the backend cloud based analytics module may capture customer behavior from touchpoints from multiple platform devices in order to catalog, analyze, and make nexuses for the captured customer behavior into the end user's user profile. Note, the cards can also be shown across different device platforms such as the smart phone, electric bicycles, TV, and/or entertainment system of a vehicle. The same or similar cards being utilized across these different platforms personalizes a user's experience across the different device platforms.

The card module is configured to collect this user behavior and then send this user behavior to the analytics module to build the user behavior profile to be indexed and stored on the database. The analytics module references this database containing the user profile that includes tracked user behavior to become contextually aware of the user's behavior in order to make automatic suggestions on the cards. The analytics module may also reference a GPS module and current location of the mobile device to assist in becoming contextually aware of the user's behavior in order to make automatic suggestions on the cards.

The analytics module, based on a user profile, is configured to suggest personalized content services to assist the user of the mobile computing device 202A in selecting content sources to be selected and displayed on the one or more cards. The suggested personalized content services for the corresponding cards can include any of the following. The analytics module may suggest targeted content based on a stage in ownership lifecycle of the mobile computing device 202A including targeted content for a new owner and that same targeted content refined out for an established owner. The analytics module may suggest apps to download and use as content sources for a card category that are not already resident on the mobile computing device 202A based on a current app usage and other information in the user profile. The analytics module may suggest video content for the card category based on preferred genres and individual profiles of videos compared to the user's profile. The analytics module may suggest places geographically nearby to a location of the mobile computing device 202A for the card category based on i) interests in the user's profile, or ii) content from a server 206C of a third party partner configured to cooperate with the user interface, and the location of the mobile computing device. The analytics module may suggest themes and wallpapers to use for the mobile computing device 202A based on interests in the user profile as well as past themes and wallpapers previously used. The analytics module may suggest surveys and polls that the user of the mobile computing device 202A may participate in based on a lifecycle stage of ownership of the mobile computing device 202A and the user profile. The analytics module may suggest promotions and offers that the user of the mobile computing device 202A is interested in based on the lifecycle stage and the user profile.

The card module is configured to cooperate with an analytics module to use push notifications and in-app notifications to provide real time feedback and proactive suggestions via the analytics module being contextually aware of both i) a current geographic location of the mobile computing device 202A via a communication link with a GPS module to provide updates on the current geographic location of the mobile computing device 202A as well as ii) past tracked and future predicted behavior of the user stored and indexed in a user profile maintained in a database in order to provide the real time feedback and proactive suggestions on the one or more cards to readily display this feedback and proactive suggestions. For example, the analytics module may present real-time information of the nearest or best offer's and rewards from the different sources recommendations of similar or enlightening information personalize content and products and services recommendations and rewards.

The analytics module communicates with the card module to automatically assist in enhancing the user's experience by supplying suggestions on all three of i) the sources of the apps and the other content sources, ii) the presentation order of the different categories of the cards, iii) the enablement or disablement of particular cards displayed by the user interface, all based on the analytic module being contextually aware of the user behavior via the user profile maintained on the user in the database.

The card module collects data on the user's behavior and then the analytic module captures and indexes the user's behavior in a user profile maintained in a database to provide suggestions on the one or more cards selected from the following aspects i) app and tip suggestions targeted based on a stage in an ownership lifecycle of the mobile computing device, ii) app suggestions based on app usage and other information in the user profile, iii) app suggestions to put one or more apps into a card category of favorite apps based on 1) a frequency of app usage, 2) a duration of app usage, and 3) any combination of both, iv) content suggestions of videos to be displayed on a video card based on 1) passion points, 2) preferred genres, 3) the user profile, and 4) any combination of these three, v) notifications about places geographically nearby based on 1) geographic location of the mobile computing device, 2) the user profile, and 3) any combination of both, vi) suggestions about themes and wallpapers to use based on 1) the user profile 2) past use of similar or same themes and wallpapers, and 3) any combination of both, vii) new apps and tip suggestions on existing apps targeted on a gaming card based on the user profile and other tracked game usage; viii) surveys and polls on cards based on lifecycle stage and the user profile, ix) suggestions on promotions and offers based on lifecycle stage and the user profile.

Again, the card module is configured to collect this user behavior and then send this user behavior to an analytics module to build the user behavior profile to be indexed and stored on the database.

The data collection routine in the card module and the analytic module may capture and index three or more tracked user behaviors for the user profile from the group consisting of i) model of mobile computing device, ii) user classified as a new users or an active old user, iii) geographical regional information on the user, iv) demographic information on the user, v) number of users of the mobile computing device, vi) which launcher program is configured to work with the card module, vii) counting each individual card views on a periodic basis, viii) counting a number of cards displayed on the display screen per user, ix) counting a number of app sessions over time and any individual app sessions, x) a captured session length on each app and each card, xi) card disable/re-enable activity, xii) card activity involving presentation order re-ordering; xiii) counting a number of shortcut icons to launch apps are on the mobile computing device, xiv) counting a number of card configuration changes made by the user over a fixed period of time, xv) counting a number of system widgets in use, xvi) counting number of views of each card along with content item click-throughs for content on that card, xvii) counting number of card title click-throughs, and xviii) counting number of expand and collapse actions on each screen card, xix) any combination of these, all of which are collected, indexed, and logical nexuses are made to form the user profile maintained in the database.

Data is collected and indexed about the user that includes individual behavior of the user on their specific device as indicated above; and also, data is collected and indexed from the population of users in general. This combined data is stored in the database and referenced by the analytics module.

The data collection routine in the mobile computing device 202A is configured to collect user behavior on the mobile computing device 202A and send this information to an analytics module. The analytics module receives data on the user's behavior from the mobile computing device 202A as well as from other device platforms, such as a smart phone, a laptop, a computing tablet, a vehicle entertainment system, an interactive television, a wearable electronic device, an electric bicycle, etc. One or more of the cards that utilize the user profile may be shared across these different device platforms to be displayed on these different device platforms. The analytics module assists to append individual app usage analytics to the user profile, which includes globally obtained user behavior from information collection algorithms on each of these device platforms. The analytics module is configured to use the user profile based on the globally obtained user behavior across these different device platforms to personalize content for the one or more cards to the user. One or more of the cards can be shared across these different device platforms to be displayed on these different device platforms, which utilize the user profile to personalize a user's experience via engagement with at least some similar cards across different device platforms.

The card module is configured to utilize a set of the one or more application program interfaces that at least includes two or more apps that come pre-installed on the mobile computing device, application program interfaces to one or more of the other computing devices external to the mobile computing device, and one or more application program interfaces to an app downloaded to the mobile computing device 202A apps that does not come pre-installed on the mobile computing device. The one or more cards are configured to allow the user of the mobile computing device 202A to select the apps and other content sources to supply the extracted newest feed of content to be displayed on the one or more cards to personalize and provide better engagement with the user of the mobile computing device.

The content sources of i) the other computing devices external to the mobile computing device 202A and ii) the apps resident in the mobile computing device 202A cooperate with one or more application program interfaces to extract a most recent content from these content sources into a corresponding card that aggregates the content into a corresponding category. The APIs can also be configured to extract other content, such as content with particular key words, from the apps and external computing devices.

The one or more application programming interfaces that are configured to extract content from the apps and the other content sources may use one or more of the following content retrieval mechanisms a restful web application programming interface, a Rich Site Summary (RSS) feed, an Atom feed, a HyperText Markup Language (HTML) WebView, a widget coded to remotely view content, and any combination of these. The card module having a set of different content retrieval mechanisms to use as application programming interfaces allows the card module to any of i) actively pull content from the content sources to a corresponding card, ii) establish an automatic forwarding that pushes content from the content sources to a corresponding card, or iii) both push to and pull information to the corresponding card as well as provide a flexibility to access different kinds of data aggregated and shown on a same category of card.

The restful web application-programming-interface gives flexible access to different kinds of data, allows deeper integration opportunities, and is a scalable interface.

The Rich Site Summary (RSS) feed provides timely content updates, is easier to aggregate content in the database, and is very suitable for content from news sources and blogs.

The Atom feed also provides timely content updates and is easy to aggregate content in the database.

The HyperText Markup Language (HTML) WebView allows easier integration across different platform devices such as a mobile computing device, TV, Webcasts, etc. The WebView can offer native look and feel for many devices in existence. The HTML) WebView cooperates with the launcher application to host web content.

A widget can be scripted to meeting published user experience guidelines for the API provided by the backend cloud platform. A widget is typically lightweight in byte size that allows easier onboarding and can be easily downloaded with each new app loaded onto the mobile device.

The user gets to see content from these apps and other external sources on that card all displayed on the user interface of the card, which makes the content from these apps and/or other content more visible on the display screen of the mobile computing device. The user does not need to search through multiple apps to see this information. The user often can also get a better big picture impression of a category by seeing the aggregated content from these different content sources.

Any one or more of the server computing systems cooperating with their associated databases can be a cloud provider. A cloud provider can install and operate application software in a cloud (e.g., the network 220 such as the Internet) and cloud users can access the application software from one or more of the client computing systems. Generally, cloud users that have a cloud-based site in the cloud cannot solely manage a cloud infrastructure or platform where the application software runs. Thus, the server computing systems and organized data structures thereof can be shared resources, where each cloud user is given a certain amount of dedicated use of the shared resources. Each cloud user's cloud-based site can be given a virtual amount of dedicated space and bandwidth in the cloud. Cloud applications can be different from other applications in their scalability, which can be achieved by cloning tasks onto multiple virtual machines at run-time to meet changing work demand. Load balancers distribute the work over the set of virtual machines. This process is transparent to the cloud user, who sees only a single access point.

Cloud-based remote access can be coded to utilize a protocol, such as Hypertext Transfer Protocol (HTTP), to engage in a request and response cycle with an application on a client computing system such as a mobile computing device application resident on the mobile computing device as well as a web-browser application resident on the mobile computing device. The cloud-based remote access can be accessed by a smartphone, a desktop computer, a tablet, or any other client computing systems, anytime and/or anywhere. The cloud-based remote access is coded to engage in 1) the request and response cycle from all web browser based applications, 2) SMS/twitter-based requests and responses message exchanges, 3) the request and response cycle from a dedicated on-line server, 4) the request and response cycle directly between a native mobile application resident on a client device and the cloud-based remote access to another client computing system, and 5) combinations of these.

In an embodiment, the server computing system 204A can include a server engine, a web page management component, a content management component, and a database management component. The server engine can perform basic processing and operating system level tasks. The web page management component can handle creation and display or routing of web pages or screens associated with receiving and providing digital content and digital advertisements. Users (e.g., cloud users) can access one or more of the server computing systems by means of a Uniform Resource Locator (URL) associated therewith. The content management component can handle most of the functions in the embodiments described herein. The database management component can include storage and retrieval tasks with respect to the database, queries to the database, and storage of data.

An embodiment of a server computing system to display information, such as a web page, etc. is discussed. An application including any program modules, apps, services, processes, and other similar software executable when executed on, for example, the server computing system 204A, causes the server computing system 204A to display windows and user interface screens on a portion of a media space, such as a web page. A user via a browser from, for example, the client computing system 202A, can interact with the web page, and then supply input to the query/fields and/or service presented by a user interface of the application. The web page can be served by a web server, for example, the server computing system 204A, on any Hypertext Markup Language (HTML) or Wireless Access Protocol (WAP) enabled client computing system (e.g., the client computing system 202A) or any equivalent thereof. For example, the client mobile computing system 202A may be a wearable electronic device, smartphone, a tablet, a laptop, a netbook, etc. The client computing system 202A can host a browser, a mobile application, and/or a specific application to interact with the server computing system 204A. Each application has a code scripted to perform the functions that the software component is coded to carry out such as presenting fields and icons to take details of desired information. Algorithms, routines, and engines within, for example, the server computing system 204A can take the information from the presenting fields and icons and put that information into an appropriate storage medium such as a database (e.g., database 206A). A comparison wizard can be scripted to refer to a database and make use of such data. The applications may be hosted on, for example, the server computing system 204A and served to the browser of, for example, the client computing system 202A. The applications then serve pages that allow entry of details and further pages that allow entry of more details.

Computing Systems

FIG. 8 illustrates a diagram of an embodiment of a card module in a computing device platform. In an embodiment, the set of modules herein, including the card module, are configured to cooperate with components on the mobile computing device that include one or more processors 820 to execute instructions, one or more memories 830, 831, to store information, one or more data input components 860 to receive data input from a user of the mobile computing device, one or more modules that include the card module, a communication circuit 870-873 to establish a communication link to communicate with other computing devices external to the mobile computing device, a display screen 891 to display at least some of the information stored in the one or more memories 830, 831, and a battery to power the mobile computing device. Portions of the modules herein, including the card module, coded as an application program 845 or as part of the operating system 834 are stored in the one or more memories 830, 831 and are executed by the one or more processors 820.

In FIG. 8, a computing system that can be part of one or more modules discussed herein is described. With reference to FIG. 8, components of the computing system 800 may include, but are not limited to, a processing unit 820 having one or more processing cores, a system memory 830, and a system bus 821 that couples various system components including the system memory 830 to the processing unit 820. The system bus 821 may be any of several types of bus structures selected from a memory bus or memory controller, a peripheral bus, and a local bus using any of a variety of bus architectures.

Computing system 800 typically includes a variety of computing machine-readable media. Computing machine-readable media can be any available media that can be accessed by computing system 800 and includes both volatile and nonvolatile media, and removable and non-removable media. By way of example, and not limitation, computing machine-readable media use includes storage of information, such as computer-readable instructions, data structures, other executable software or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by the computing device 800. Transitory media such as wireless channels are not included in the machine-readable media. Communication media typically embody computer readable instructions, data structures, other executable software, or other transport mechanism and includes any information delivery media. As an example, some client computing systems on the network 220 of FIG. 7 might not have optical or magnetic storage.

The system memory 830 includes computer storage media in the form of volatile and/or nonvolatile memory such as read only memory (ROM) 831 and random access memory (RAM) 832. A basic input/output system 833 (BIOS) containing the basic routines that help to transfer information between elements within the computing system 800, such as during start-up, is typically stored in ROM 831. RAM 832 typically contains data and/or software that are immediately accessible to and/or presently being operated on by the processing unit 820. By way of example, and not limitation, FIG. 8 illustrates that RAM 832 can include a portion of the operating system 834, application programs 835, other executable software 836, and program data 837.

The computing system 800 can also include other removable/non-removable volatile/nonvolatile computer storage media. By way of example only, FIG. 8 illustrates a solid-state memory 841. Other removable/non-removable, volatile/nonvolatile computer storage media that can be used in the example operating environment include, but are not limited to, USB drives and devices, flash memory cards, solid state RAM, solid state ROM, and the like. The solid-state memory 841 is typically connected to the system bus 821 through a non-removable memory interface such as interface 840, and USB drive 851 is typically connected to the system bus 821 by a removable memory interface, such as interface 850.

The drives and their associated computer storage media discussed above and illustrated in FIG. 8, provide storage of computer readable instructions, data structures, other executable software and other data for the computing system 800. In FIG. 8, for example, the solid state memory 841 is illustrated for storing operating system 844, application programs 845, other executable software 846, and program data 847. Note that these components can either be the same as or different from operating system 834, application programs 835, other executable software 836, and program data 837. Operating system 844, application programs 845, other executable software 846, and program data 847 are given different numbers here to illustrate that, at a minimum, they are different copies.

A user may enter commands and information into the computing system 800 through input devices such as a keyboard, touchscreen, or software or hardware input buttons 862, a microphone 863, a pointing device and/or scrolling input component, such as a mouse, trackball or touch pad. The microphone 863 can cooperate with speech recognition software. These and other input devices are often connected to the processing unit 820 through a user input interface 860 that is coupled to the system bus 821, but can be connected by other interface and bus structures, such as a parallel port, game port, or a universal serial bus (USB). A display monitor 891 or other type of display screen device is also connected to the system bus 821 via an interface, such as a display interface 890. In addition to the monitor 891, computing devices may also include other peripheral output devices such as speakers 897, a vibrator 899, and other output devices, which may be connected through an output peripheral interface 895.

The computing system 800 can operate in a networked environment using logical connections to one or more remote computers/client devices, such as a remote computing system 880. The remote computing system 880 can a personal computer, a hand-held device, a server, a router, a network PC, a peer device or other common network node, and typically includes many or all of the elements described above relative to the computing system 800. The logical connections depicted in FIG. 8 can include a personal area network (PAN) 872 (e.g., Bluetooth®), a local area network (LAN) 871 (e.g., Wi-Fi), and a wide area network (WAN) 873 (e.g., cellular network), but may also include other networks such as a personal area network (e.g., Bluetooth®). Such networking environments are commonplace in offices, enterprise-wide computer networks, intranets and the Internet. A browser application may be resident on the computing device and stored in the memory.

When used in a LAN networking environment, the computing system 800 is connected to the LAN 871 through a network interface or adapter 870, which can be, for example, a Bluetooth® or Wi-Fi adapter. When used in a WAN networking environment (e.g., Internet), the computing system 800 typically includes some means for establishing communications over the WAN 873. With respect to mobile telecommunication technologies, for example, a radio interface, which can be internal or external, can be connected to the system bus 821 via the network interface 870, or other appropriate mechanism. In a networked environment, other software depicted relative to the computing system 800, or portions thereof, may be stored in the remote memory storage device. By way of example, and not limitation, FIG. 8 illustrates remote application programs 885 as residing on remote computing device 880. It will be appreciated that the network connections shown are examples and other means of establishing a communications link between the computing devices may be used.

As discussed, the computing system 800 can include a processor 820, a memory (e.g., ROM 831, RAM 832, etc.), a built in battery to power the computing device, an AC power input to charge the battery, a display screen, a built-in Wi-Fi circuitry to wirelessly communicate with a remote computing device connected to network.

It should be noted that the present design can be carried out on a computing system such as that described with respect to FIG. 8. However, the present design can be carried out on a server, a computing device devoted to message handling, or on a distributed system in which different portions of the present design are carried out on different parts of the distributed computing system.

Another device that may be coupled to bus 821 is a power supply such as a DC power supply (e.g., battery) or an AC adapter circuit. As discussed above, the DC power supply may be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied onto a non-transitory machine-readable medium. A machine-readable medium includes any mechanism that stores information in a form readable by a machine (e.g., a computer). For example, a non-transitory machine-readable medium can include read only memory (ROM); random access memory (RAM); magnetic disk storage media; optical storage media; flash memory devices; Digital Versatile Disc (DVD's), EPROMs, EEPROMs, FLASH memory, magnetic or optical cards, or any type of media suitable for storing electronic instructions.

Note, an application described herein includes but is not limited to software applications, mobile apps, and programs that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

Figure 9A:
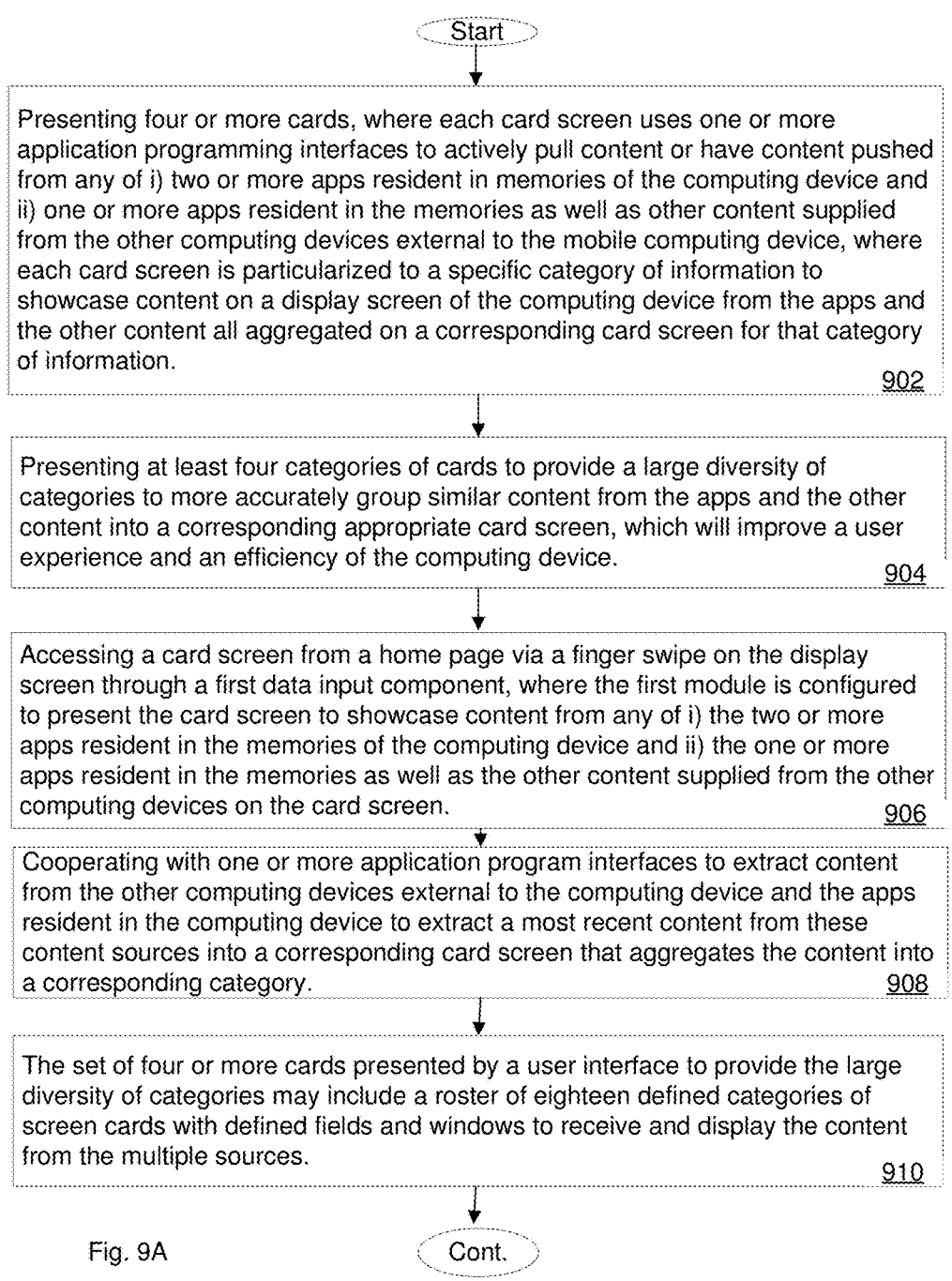

FIGS. 9A-9C illustrate diagrams of an embodiment of a method of presenting at least four categories of cards to provide a large diversity of categories to more accurately group similar content from the apps and the other content into a corresponding appropriate card. Note, the example steps below may be performed not in the order below, add steps not listed below, and not perform some of the steps listed below.

In step 902, four or more cards are presented on a display screen. Each card uses one or more application programming interfaces to actively pull content or have content pushed from any of i) two or more apps resident in memories of the device and ii) one or more apps resident in the memories as well as other content supplied from the other computing devices external to the computing device. Each card is particularized to a specific category of information to showcase content on a display screen of the computing device from the apps and the other content all aggregated on a corresponding card for that category of information.

In step 904, at least four categories of cards are presented to provide a large diversity of categories to more accurately group similar content from the apps and the other content into a corresponding appropriate card, which will improve a user experience and an efficiency of the computing device. Also, the user gets to see content from these apps and other content on one card all displayed on the user interface of the card, which makes the content from these apps and other content more visible on the display screen of the computing device. A configuration screen cooperating with the card module allows the user of the computing device to personalize many aspects of the set of cards and these user customizations make more efficient use of computing cycles of the processors to view content rather than launching multiple apps to find the content of interest.

In step 906, the set of cards are accessed from a home screen via i) a horizontal or vertical finger swipe on the display screen through a first data input component, ii) a cursor arrow input on the home screen on the display screen through a first data input component, iii) a voice command received via a microphone data input component and a speech recognition application input to the card module, iv) an arrow key depression on an icon on the home screen on the display screen through the first data input component, v) a depression of a push button to an option presented by the card module, and vi) any combination of these. The card module is configured to present each card to showcase content from any of i) the two or more apps resident in the memories of the computing device and ii) the one or more apps resident in the memories as well as the other content supplied from the other computing devices on that card.

In step 908, the set of screen cards cooperate with one or more application program interfaces to extract content from the other computing devices external to the computing device and the apps resident in the computing device to extract, for example, a most recent content and/or content related to a set of key words, etc. from these content sources into a corresponding card that aggregates the content into a corresponding category.

In step 910, the set of four or more cards presented by a user interface to provide the large diversity of categories may include a roster of eighteen defined categories of screen cards with defined fields and windows to receive and display the content from the multiple sources. The set may include:

A first card that aggregates and displays a card category of content coming from the apps and from the other computing devices that supply e-mail communications including a set of the most recent e-mail messages received in an inbox from potentially across multiple user accounts.

a second card that aggregates and displays a card category of content coming from the apps and from the other computing devices that supply date information, time information, and weather information, selected from a group consisting of a current date, a current time at the computing device's current geographic location, and current weather conditions at the computing device's current geographic location.

A third card that aggregates and displays a card category of content coming from the apps and from the other computing devices that supply audio content, including music, including two or more most recent audio tracks played.

A fourth card that aggregates and displays a card category of content coming from the apps and from the other computing devices that supply sports related content including sports news and sports scores.

A fifth card that aggregates and displays a card category of content coming from the apps and from the other computing devices that supply themes content and wallpaper content including two or more of i) the latest themes and wallpapers used by the device or ii) themes and wallpapers marked by the user to highlight.

A sixth card that aggregates and displays a card category of content coming from the apps and from the other computing devices that supply links or portions of recent news articles based on interests indicated by a user profile maintained for the user of this computing device.

A seventh card that aggregates and displays a card category of content coming from the apps and from the other computing devices that supply live content including recently played live-streamed content and two or more featured channels.

An eighth card that aggregates and displays a card category of content coming from the apps and from the other computing devices that supply calendaring information including items in today's calendar from one or more sources.

A ninth card that aggregates and displays a card category of content coming from the apps and from the other computing devices that supply gaming information selected from a group consisting of gaming apps, partner game promotions, and game content.

A tenth card that aggregates and displays a card category of content coming from the apps or components on the computing device selected from a group consisting of Battery percentage left, RAM Usage, and Storage Used/Available.

An eleventh card that aggregates and displays a card category of content coming from the apps and from the other computing devices that supply messages selected from a group consisting of SMS text messages, instant messaging texts, and notifications from websites including auction websites.

A twelfth card that aggregates and displays a card category of content coming from the apps and from the other computing devices that supply social media content.

A thirteenth card that aggregates and displays a card category of content coming from the apps and from the other computing devices that supply relevant information on geographically nearby places and businesses via one or more links to online sites that search for restaurants, shopping, or transit near a current location of the device.

A fourteenth card that aggregates and displays a card category of a collection of app shortcuts to launch favorite apps as well as most recently used apps by the user.

A fifteenth card that aggregates and displays a card category of apps and tips that includes two or more most recent tips or app recommendations from an analytics module using a user profile.

A sixteenth card that aggregates and displays a card category of content coming from the apps and from the other computing devices that supply video content selected from the group consisting of recently played videos file content, two or more popular videos as well as favorite videos.

A seventeenth card that aggregates and displays a card category of notes from the user to themselves.

An eighteenth card that aggregates and displays a card category of latest community posts across two or more device platforms, selected from a group consisting of a smart phone, a laptop, a vehicle, a television, and a wearable electronic device, configured to display the four or more cards. Also, each card past the first card on a card screen is navigated to via any operation selected from the group consisting of i) a finger swipe on the display screen through a first data input component, ii) a cursor arrow input on the card screen on the display screen through a first data input component, iii) a voice command received via a microphone data input component and a speech recognition application input to the card module, iv) an arrow key depression on an icon on the card screen on the display screen through a first data input component, v) a depression of a push button to an option presented by the card module, and vi) any combination of these.

In step 912, the user interface presents at least eight different cards from the above group. A data collection routine in the computing device collects user behavior on the computing device and sends this information to the analytics module. The analytics module receives data on the user's behavior from at least one other device platform to form the user profile on the user. One or more of the cards that utilize the user profile are shared across these different device platforms to be displayed on these different device platforms.

In step 914, the application programming interfaces are configured to extract content from the apps and the other content sources via use of one or more content retrieval mechanisms selected from the group consisting of a restful web application programming interface, a Rich Site Summary (RSS) feed, an Atom feed, a HyperText Markup Language (HTML) WebView, a widget coded to remotely view content, and any combination of these. Note, using and having a set of different content retrieval mechanisms allows a card module to any of i) actively pull content from the content sources to a corresponding card, ii) establish an automatic forwarding that pushes content from the content sources to a corresponding card, or iii) both push to and pull information to the corresponding card as well as provide a flexibility to access different kinds of data aggregated and shown on a same category of card.

In step 916, operators on the screen card as well as other commands from the input device allow expanding or collapsing a given screen card into a collapsed window size state to show a subset of information or into an expanded window size state to show a fuller set of information on that card from a single data structure containing an entire set of information by resizing a size of a window displaying the content within that card. Note, use of a single data structure as a source for the set of information causes a smoother animation transition on the display screen and eliminates jitter to show the displayed content from the single data structure rather than drawing content from two or more data structures, and then switching the display of those data structures, each containing their own set of information being displayed in the window.

In step 918, pop-up windows and or other notes on the set of cards themselves suggest personalized content services based on a user profile to assist the user of the computing device in selecting content sources to be selected and displayed on the one or more cards. The analytics module may gather additional data from a web bot or network information gathering device to actively gain information from content sources on the Internet or from cooperating partners to deliver additional content including products services and information to the user of the computing device based on the user profile, which are then suggested on the appropriate card representing that category of content.

In step 920, the card module cooperating with the analytics module provides:

suggested targeted content based on a stage in ownership lifecycle of the computing device including targeted content for a new owner and that same targeted content refined out for an established owner;

suggested apps to download and use as content sources for a card category that are not already resident on the computing device based on a current app usage and other information in the user profile;

suggested video content for the card category based on preferred genres and profile cards of contents in a video compared to the user's profile;

suggested places geographically nearby to a location of the computing device for the card category based on i) interests in the user's profile, or ii) content from a server of a third party partner configured to cooperate with the user interface, and the location of the computing device;

suggested themes and wallpapers to use for the computing device based on interests in the user profile as well as past themes and wallpapers previously used;

suggested surveys and polls that the user of the computing device may participate in based on a lifecycle stage of ownership of the computing device and the user profile; and/or suggested promotions and offers that the user of the computing device is interested in based on the lifecycle stage and the user profile.

Figure 10A:
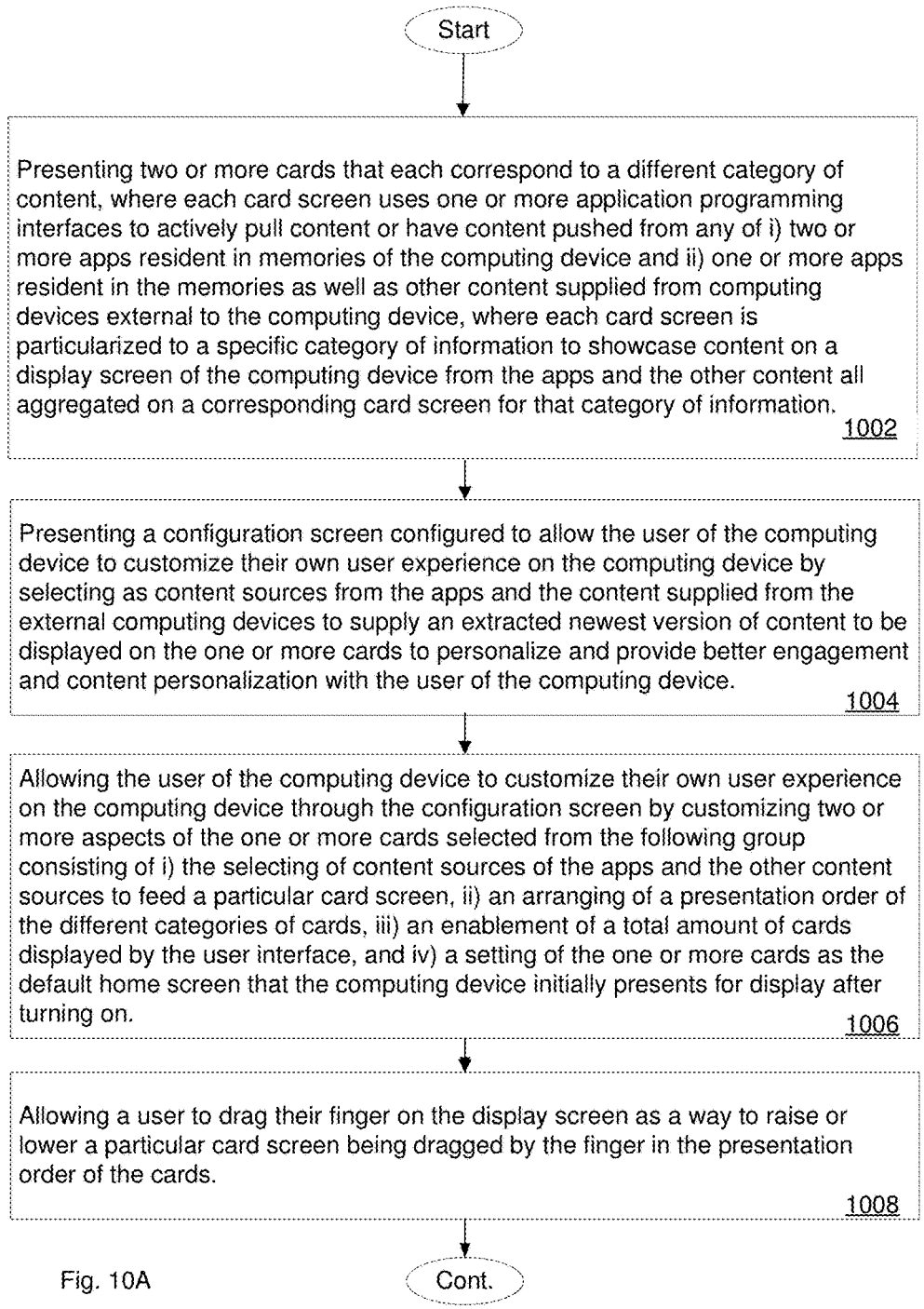

FIGS. 10A-10C illustrate diagrams of an embodiment of method with the cards to customize and personalize the user experience. Note, the example steps below may be performed not in the order below, add steps not listed below, and not perform some of the steps listed below.

In step 1002, two or more cards are presented that each correspond to a different category of content. Each card uses one or more application programming interfaces to actively pull content or have content pushed from any of i) two or more apps resident in memories of the computing device and ii) one or more apps resident in the memories as well as other content supplied from computing devices external to the computing device. Each card is particularized to a specific category of information to showcase content on a display screen of the computing device from the apps and the other content all aggregated on a corresponding card for that category of information.

In step 1004, a configuration screen is presented to allow the user of the computing device to customize their own user experience on the computing device by selecting as potential content sources from both the apps and the external computing devices to supply an extracted newest version of content to be displayed on the two or more cards to personalize content and provide better engagement with the user of the computing device.

In step 1006, the user of the computing device is allowed to customize their own user experience on the computing device through the configuration screen by customizing two or more aspects of the one or more cards selected from the following group consisting of i) the selecting of content sources of the apps and the other content sources to feed a particular card, ii) an arranging of a presentation order of the different categories of cards, iii) an enablement of a total amount of cards displayed by the user interface, and iv) a setting of the one or more cards as the default home screen that the computing device initially presents for display after turning on. The configuration screen cooperating with the card module and analytics module allow the user of the computing device to customize their own user experience on the computing device by selecting many aspects of the display of the set of cards in order to personalize and provide better engagement with the user of the computing device. Thus, the card module cooperating with the configuration screen allows the user's customization to make more efficient use of computing cycles of the processors to view aggregated content on the first card rather than launching multiple apps to find the content of interest in each of the apps.

In step 1008, the user is allowed to drag their finger on the display screen as a way to raise or lower a particular card being dragged by the finger in the presentation order of the cards.

In step 1010, the dynamic discovery module analyzes and discovers a type of app resident in the memories of the computing device and what type of content is associated with the discovered app in order to aggregate and display content from that app into a corresponding category of card.

In step 1012, a roster screen listing of all possible cards is presented and then the user may then individually select to enable or disable that card for display on the display screen.

In step 1014, a database is referenced that contains a user profile that includes tracked user behavior to become contextually aware of the user's behavior.

The card module and analytics module are coded to automatically assist in enhancing the user's experience by supplying suggestions on all three of i) the content sources of the apps and the other content, ii) the presentation order of the different categories of cards, iii) the enablement or disablement of particular cards displayed by the user interface, all based on the analytic module being contextually aware of the user behavior via the user profile maintained on the user in the database.

In step 1016, the card module collects user behavior on the computing device and send this information to an analytics module. The analytics module receives data on the user's behavior from the computing device as well as from other device platforms, selected from a group consisting of a smart phone, a laptop, a computing tablet, a vehicle entertainment system, an interactive television, and a wearable electronic device. One or more of the cards that utilize the user profile are shared across these different device platforms to be displayed on these different device platforms. The analytics module assists to append individual app usage analytics to the user profile, which includes globally obtained user behavior from information collection algorithms on each of these device platforms. The analytics module is configured to use the user profile based on the globally obtained user behavior across these different device platforms to personalize content for the one or more cards to the user.

In step 1018, the card module collects data on the user's behavior and then capturing and indexing the user's behavior in a user profile maintained in a database to provide suggestions on the one or more cards selected from the group consisting of i) app and tip suggestions targeted based on a stage in an ownership lifecycle of the computing device, ii) app suggestions based on app usage and other information in the user profile, iii) app suggestions to put one or more apps into a card category of favorite apps based on 1) a frequency of app usage, 2) a duration of app usage, and 3) any combination of both, iv) content suggestions of videos to be displayed on a video card based on 1) preferred genres 2) the user profile, and 3) any combination of these two, v) notifications about places geographically nearby based on 1) geographic location of the computing device, 2) the user profile, and 3) any combination of both, vi) suggestions about themes and wallpapers to use based on 1) the user profile 2) past use of similar or same themes and wallpapers, and 3) any combination of both, vii) new apps and tip suggestions on existing apps targeted on a gaming card based on the user profile and other tracked game usage.

viii) surveys and polls on cards based on lifecycle stage and the user profile, ix) suggestions on promotions and offers based on lifecycle stage and the user profile.

The card module is configured to collect this user behavior and then send this user behavior to an analytics module to build the user behavior profile to be indexed and stored on the database.

Many functions performed by electronic hardware components can be duplicated by software emulation. Thus, a software program written to accomplish those same functions can emulate the functionality of the hardware components in input-output circuitry.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

What is claimed is:

1. A non-transitory machine-readable medium configured to store instructions and data, which when executed by one or more processors on a mobile computing device, causes the following operations, comprising:

presenting two or more cards that each correspond to a different category of content, where each card uses one or more application programming interfaces to actively pull content or have content pushed from any of i) two or more apps resident in memories of the mobile computing device and ii) one or more apps resident in the memories as well as other content supplied from computing devices external to the mobile computing device;

where each card is particularized to a specific category of information to showcase content on a display screen of the mobile computing device from the apps and the other content all aggregated on that specific card for that category of information; and presenting a configuration screen configured to allow the user of the mobile computing device to customize their own user experience on the mobile computing device by selecting as potential content sources from both the apps and the external computing devices to supply an extracted newest version of content to be displayed on the two or more cards to personalize content and provide better engagement with the user of the mobile computing device.

2. The non-transitory machine-readable medium of claim 1, where further operations comprise:

allowing the user of the mobile computing device to customize their own user experience on the mobile computing device through the configuration screen by customizing two or more aspects of the one or more cards selected from the following group consisting of i) the selecting of content sources of the apps and the other content sources to feed a particular card, ii) an arranging of a presentation order of the different categories of cards, iii) an enabling whether a particular card will be displayed by the user interface or not displayed, and iv) a setting of the one or more cards as the default home screen that the mobile computing device initially presents for display after turning on.

3. The non-transitory machine-readable medium of claim 2, where further operations comprise:

allowing a user to drag their finger on the display screen as a way to raise or lower a particular card being dragged by the finger in the presentation order of the cards.

4. The non-transitory machine-readable medium of claim 1, where further operations comprise:

analyzing and discovering a type of app resident in the memories of the mobile computing device and what type of content is associated with the discovered app in order to aggregate and display content from that app into a corresponding category of card.

5. The non-transitory machine-readable medium of claim 2, where further operations comprise:

presenting a roster screen listing of all possible cards in which the user may then individually select to enable or disable that card for display on the display screen.

6. The non-transitory machine-readable medium of claim 2, where further operations comprise:

referencing a database containing a user profile that includes tracked user behavior to become contextually aware of the user's behavior; and automatically assisting in enhancing the user's experience by supplying suggestions on all three of i) the content sources of the apps and the other content, ii) the presentation order of the different categories of cards, iii) the enablement or disablement of particular cards displayed by the user interface, all based on an analytic module being contextually aware of the user behavior via the user profile maintained on the user in the database.

7. The non-transitory machine-readable medium of claim 1, where further operations comprise:

collecting data on the user's behavior and then capturing and indexing the user's behavior in a user profile maintained in a database to provide suggestions on the one or more cards selected from the group consisting of i) app and tip suggestions targeted based on a stage in an ownership lifecycle of the mobile computing device, ii) app suggestions based on app usage and other information in the user profile, iii) app suggestions to put one or more apps into a card category of favorite apps based on 1) a frequency of app usage, 2) a duration of app usage, and 3) any combination of both, iv) content suggestions of videos to be displayed on a video card based on 1) preferred genres 2) the user profile, and 3) any combination of these two, v) notifications about places geographically nearby based on 1) geographic location of the mobile computing device, 2) the user profile, and 3) any combination of both, vi) suggestions about themes and wallpapers to use based on 1) the user profile 2) past use of similar or same themes and wallpapers, and 3) any combination of both, vii) new apps and tip suggestions on existing apps targeted on a gaming card based on the user profile and other tracked game usage; viii) surveys and polls on cards based on lifecycle stage and the user profile, ix) suggestions on promotions and offers based on lifecycle stage and the user profile, and where the card module is configured to collect this user behavior and then send this user behavior to an analytics module to build the user behavior profile to be indexed and stored on the database.

8. An apparatus, comprising:

a card module of a mobile computing device, where the card module is configured to cooperate with components on the mobile computing device that include one or more processors to execute instructions, one or more memories to store information, one or more data input components to receive data input from a user of the mobile computing device, one or more modules that include the card module, a communication circuit to establish a communication link to communicate with other computing devices external to the mobile computing device, a display screen to display at least some of the information stored in the one or more memories, and a battery to power the mobile computing device, where portions of the card module implemented in software are stored in the one or more memories and are executed by the one or more processors; and where the card module is configured to present a user interface with one or more cards that each correspond to a different category of content, where the card module is configured to present a first card to showcase content on the display screen from any of i) two or more apps resident in the memories of the mobile computing device and ii) one or more apps resident in the memories as well as other content supplied from the other computing devices external to the mobile computing device, which is all aggregated on the first card, where the user gets to see content from these apps and other content on the first card all displayed on the user interface of the card, which makes the content from these apps and other content more visible on the display screen of the mobile computing device, where the user interface also presents a configuration screen configured to allow the user of the mobile computing device to customize their own user experience on the mobile computing device by selecting as potential content sources from both the apps and the external computing devices to supply an extracted newest version of content to be aggregated and displayed on a corresponding card in order to personalize and provide better engagement with the user of the mobile computing device; and thus, the card module cooperating with the configuration screen allows the user's customization to make more efficient use of computing cycles of the processors to view aggregated content on the first card rather than launching multiple apps to find the content of interest in each of the apps.

9. The apparatus of claim 8, where the card module is configured to cooperate with an analytics module to use push notifications and in-app notifications to provide real time feedback and proactive suggestions via the analytics module being contextually aware of both i) a current geographic location of the mobile computing device via a communication link with a GPS module to provide updates on the current geographic location of the mobile computing device as well as ii) past tracked and future predicted behavior of the user stored and indexed in a user profile maintained in a database in order to provide the real time feedback and proactive suggestions on the one or more cards to readily display this feedback and proactive suggestions.

10. The apparatus of claim 8, where the card module is configured to establish communication links with and cooperate with the configuration screen, a GPS module, and one or more third party servers to present any of a screen, drop down menu, or a pop up window to allow the user to customize their user experience by selecting i) to opt in or ii) not opt in to receive communications, including but not limited to notifications of at least one of best deals, nearby places, coupons from the internet or from the third party server, promotions, and other suggestions, when geographically near the third party's establishment.

11. The apparatus of claim 8, where the card module is configured to cooperate with an analytics module to collect data on the user's behavior and then capture and index the user's behavior in the user profile maintained in a database to provide suggestions on the one or more cards selected from the group consisting of i) app and tip suggestions targeted based on a stage in an ownership lifecycle of the mobile computing device, ii) app suggestions based on app usage and other information in the user profile, iii) app suggestions to put one or more apps into a card category of favorite apps based on 1) a frequency of app usage, 2) a duration of app usage, and 3) any combination of both, iv) content suggestions of videos to be displayed on a video card based on 1) preferred genres, 2) the user profile, and 3) any combination of these two, v) notifications about places geographically nearby based on 1) geographic location of the mobile computing device, 2) the user profile, and 3) any combination of both, vi) suggestions about themes and wallpapers to use based on 1) the user profile 2) past use of similar or same themes and wallpapers, and 3) any combination of both, vii) new apps and tip suggestions on existing apps targeted on a gaming card based on the user profile and other tracked game usage; viii) surveys and polls on cards based on lifecycle stage and the user profile, ix) suggestions on promotions and offers based on lifecycle stage and the user profile, and where the card module is configured to collect this user behavior and then send this user behavior to the analytics module to build the user behavior profile to be indexed and stored on the database.

12. The apparatus of claim 8, where a data collection routine in the mobile computing device is configured to collect user behavior on the mobile computing device and send this information to an analytics module, where the analytics module receives data on the user's behavior; and thus, where the analytics module cooperates with the card module to collect data to form the user profile; where the analytics module is further configured to gather customer usage analytics and insights across the multiple apps and the other computing devices, where the analytics module after gathering these analytics and insights then builds a robust and well-rounded user profile personalized to that user of the mobile computing device.

13. The apparatus of claim 12, where the data collection routine and the analytic module capture and index three or more tracked user behaviors for the user profile from the group consisting of i) model of mobile computing device, ii) user classified as a new users or an active old user, iii) geographical regional information on the user, iv) demographic information on the user, v) number of users of the mobile computing device, vi) which launcher program is configured to work with the card module, vii) counting each individual card views on a periodic basis, viii) counting a number of cards displayed on the display screen per user, ix) counting a number of app sessions over time and any individual app sessions, x) a captured session length on each app and each card, xi) card disable/re-enable activity, xii) card activity involving presentation order re-ordering; xiii) counting a number of shortcut icons to launch apps are on the mobile computing device, xiv) counting a number of card configuration changes made by the user over a fixed period of time, xv) counting a number of system widgets in use, xvi) counting number of views of each card along with content item click-throughs for content on that card, and xvii) any combination of these, all of which are collected, indexed, and logical nexuses are made to form the user profile maintained in the database.

14. The apparatus of claim 8, where a data collection routine in the mobile computing device is configured to collect user behavior on the mobile computing device and send this information to an analytics module, where the analytics module receives data on the user's behavior from the mobile computing device as well as from other device platforms, selected from a group consisting of a smart phone, a laptop, a computing tablet, a vehicle entertainment system, an interactive television, and a wearable electronic device, where one or more of the cards that utilize the user profile are shared across these different device platforms to be displayed on these different device platforms, where the analytics module assists to append individual app usage analytics to the user profile, which includes globally obtained user behavior from information collection algorithms on each of these device platforms, where the analytics module is configured to use the user profile based on the globally obtained user behavior across these different device platforms to personalize content for the one or more cards to the user.

15. The apparatus of claim 8, where the configuration screen is configured to allow the user of the mobile computing device to customize their own user experience on the mobile computing device by customizing two or more aspects of the one or more cards selected from the following group consisting of i) the selecting of content sources of the apps and the other content sources to feed a particular card, ii) an arranging of a presentation order of the different categories of cards, iii) an enablement of a total amount of cards displayed by the user interface, and iv) a setting of the one or more cards as the default home screen that the mobile computing device initially presents for display after turning on.

16. The apparatus of claim 15, where the configuration screen is configured to cooperate with a touch screen module of the display screen to allow a user to drag their finger on the display screen as a way to raise or lower a particular card being dragged by the finger in the presentation order of the cards as well as the configuration screen configured to present a roster screen listing all of the possible cards and then the user may individually designate each card's position in the presentation order of the cards, where the different one or more cards are positioned in presentation order, relative to each other, in either i) a vertical stack of cards, ii) a horizontal stack of cards, or iii) a combination of both.

17. The apparatus of claim 15, where the card module is configured to cooperate with a dynamic discovery module to analyze and discover a type of app resident in the memories of the mobile computing device via use of an app's name and other meta data associated with that app and then references the name and the meta data to information categorized on potential known existing apps recorded in a database or table and what type of content is associated with the discovered app in order to aggregate and display content from that app into a corresponding category of card when chosen by the user to be one or the selected sources of content for that category of card.

18. The apparatus of claim 15, where the configuration screen is configured to present a roster screen listing of all possible cards and their associated icon in which the user may individually select to enable or disable that card for display on the display screen via the associated icon for each card.

19. The apparatus of claim 8, where the card module is configured to cooperate with a dynamic discovery module to analyze a population of potential apps available in an app store and supply app recommendations based on any of the following selected from the group consisting of i) user profile information on this particular user, ii) frequency of use of certain apps of this particular user, iii) browsing habits of this particular user, and iv) apps being used by other users with similar user profiles.

20. The apparatus of claim 8, where the card module is configured to cooperate with an analytics module to assist the user of the mobile computing device in customizing three or more aspects of the one or more cards, where the analytics module references a database containing a user profile that includes tracked user behavior to become contextually aware of the user's behavior, where the analytics module communicates with the card module to automatically assist in enhancing the user's experience by supplying suggestions on all three of i) the sources of the apps and the other content sources, ii) the presentation order of the different categories of the cards, iii) the enablement or disablement of particular cards displayed by the user interface, all based on the analytic module being contextually aware of the user behavior via the user profile maintained on the user in the database.

21. A method for an electronic computing device, comprising:
presenting two or more cards that each correspond to a different category of content, where each card uses one or more application programming interfaces to actively pull content or have content pushed from any of i) two or more apps resident in memories of the electronic computing device and ii) one or more apps resident in the memories as well as other content supplied from computing devices external to the electronic computing device;
where each card is particularized to a specific category of information to showcase content on a display screen of the electronic computing device from the apps and the other content all aggregated on that specific card for that category of information; and
presenting a configuration screen configured to allow the user of the electronic computing device to customize their own user experience on the electronic computing device by selecting as potential content sources from both the apps and the external computing devices to supply an extracted newest version of content to be displayed on the two or more cards to personalize content and provide better engagement with the user of the electronic computing device.

22. The method of claim 21, further comprising:
allowing the user of the electronic computing device to customize their own user experience on the electronic computing device by customizing two or more aspects of the one or more cards selected from the following group consisting of i) the selecting of content sources of the apps and the other content sources to feed a particular card, ii) an arranging of a presentation order of the different categories of cards, iii) an enabling of a whether a particular card will be displayed by the user interface or not be displayed, and iv) a setting of the one or more cards as the default home screen that the electronic computing device initially presents for display after turning on.

* * * * *